United States Patent
Yu et al.

(10) Patent No.: US 11,750,274 B2
(45) Date of Patent: *Sep. 5, 2023

(54) ADAPTIVE NARROWBAND INTERFERENCE REJECTION FOR SATELLITE NAVIGATION RECEIVER

(71) Applicant: Deere & Company, Moline, IL (US)

(72) Inventors: Wei Yu, Torrance, CA (US); Mark P. Kaplan, Culver City, CA (US); Richard G. Keegan, Palos Verdes Estates, CA (US); David M. Li, Harbor City, CA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,584

(22) Filed: Sep. 30, 2021

(65) Prior Publication Data

US 2022/0123770 A1    Apr. 21, 2022

Related U.S. Application Data

(60) Provisional application No. 63/093,161, filed on Oct. 16, 2020.

(51) Int. Cl.
*H04B 7/185* (2006.01)
*H04B 1/10* (2006.01)
*H04B 1/71* (2011.01)

(52) U.S. Cl.
CPC ....... *H04B 7/18513* (2013.01); *H04B 1/1036* (2013.01); *H04B 1/7101* (2013.01);
(Continued)

(58) Field of Classification Search
CPC .... H04B 1/1036; H04B 15/00; H04B 17/345; H04B 17/318; H04B 1/71; H04B 1/709; H04B 17/373; H04B 1/7103; H04B 17/00; H04B 17/21; H04B 17/26; H04B 17/327; H04B 2201/709709; H04B 2201/709745;
(Continued)

(56) References Cited

U.S. PATENT DOCUMENTS 5,121,009 A   6/1992   Braathen
5,263,053 A   11/1993  Wan et al.
(Continued)

FOREIGN PATENT DOCUMENTS

CA   2902604 A1   9/2014
CA   2893306 A1   12/2015
(Continued)

OTHER PUBLICATIONS

International Search Report and Written Opinion, re PCT Application No. PCT/US21/71873 dated Dec. 14, 2021 (22 pages).
(Continued)

*Primary Examiner* — Golam Sorowar

(57) ABSTRACT

A controller is configured to control the adaptive notch filter and to execute a search technique (e.g., artificial intelligence (AI) search technique) to converge on filter coefficients and to recursively adjust the filter coefficients of the adaptive notch filter in real time to adaptively adjust one or more filter characteristics (e.g., maximum notch depth or attenuation, bandwidth of notch, or general magnitude versus frequency response of notch).

24 Claims, 16 Drawing Sheets

(52) U.S. Cl.
CPC .............. *H04B 2001/1045* (2013.01); *H04B 2001/1063* (2013.01)

(58) Field of Classification Search
CPC .... H04B 7/2634; H04B 1/0475; H04B 1/525; H04B 2001/0408; H04B 1/0003; H04B 1/715; H04B 15/02; H04B 1/0042; H04B 1/10; H04B 1/401; H04B 1/713; H04B 2001/1045; H04B 17/336; H04B 1/7097; H04B 2001/1063; H04W 24/08; H04W 24/10; H04W 72/082; H04W 28/04; H04W 72/085; H04W 28/0236; H04W 72/0453; H04W 72/1231; H04W 52/243; H04W 24/02; H04W 16/28; H04W 4/02; H04W 4/023; H04W 4/029; H04W 40/16; H04W 52/04; H04W 52/14; H04W 64/00; H04W 64/006; H04W 72/0446; H04W 72/0486; H04W 72/1226; H04W 52/241; H04W 88/08; H04W 88/085; H04W 16/32; H04W 24/06; H04W 36/08; H04L 5/006; H04L 5/0073; H04L 41/069; H04L 5/0007; H04L 5/0026; H04L 5/0032; H04L 25/0212; H04L 25/025; H04L 5/14; H04L 5/1461; H04L 1/0021; H04L 1/0026; H04L 1/242; H04L 41/0823; H04L 41/12; H04L 43/0829; H04L 43/0852; H04L 43/16; H04L 43/50; H04L 45/22; H04L 45/28; H04L 5/001; H04L 5/0053; H04L 5/0082; H04L 69/323; H04L 25/08; H04L 1/0071; H04L 27/26414; H04L 27/26538

See application file for complete search history.

(56) References Cited

U.S. PATENT DOCUMENTS

| | | | |
|---|---|---|---|
| 5,293,402 A * | 3/1994 | Crespo | H04L 25/03057 375/348 |
| 5,309,482 A | 5/1994 | Wright et al. | |
| 6,141,371 A | 10/2000 | Holmes et al. | |
| 6,664,923 B1 | 12/2003 | Ford | |
| 6,810,027 B1 | 10/2004 | Posti | |
| 7,205,935 B2 | 4/2007 | Sleewaegen | |
| 7,860,145 B2 | 12/2010 | Knight et al. | |
| 8,243,772 B2 | 8/2012 | Knight et al. | |
| 9,197,285 B2 | 11/2015 | Yu | |
| 2002/0047799 A1 | 4/2002 | Gustafson et al. | |
| 2002/0198656 A1 | 12/2002 | Ford et al. | |
| 2003/0189975 A1 | 10/2003 | Fullerton | |
| 2004/0087290 A1 | 5/2004 | Schmidt et al. | |
| 2004/0095274 A1 | 5/2004 | Warloe et al. | |
| 2004/0150557 A1 | 8/2004 | Ford et al. | |
| 2004/0176034 A1 * | 9/2004 | Hunter | H04B 1/1036 455/63.1 |
| 2006/0012516 A1 | 1/2006 | Ford et al. | |
| 2006/0040613 A1 | 2/2006 | Karabinis et al. | |
| 2006/0133551 A1 | 6/2006 | Davidoff et al. | |
| 2007/0058700 A1 | 3/2007 | Fenton | |
| 2007/0201588 A1 | 8/2007 | Loiseau et al. | |
| 2010/0118921 A1 | 5/2010 | Abdelmonem et al. | |
| 2010/0195775 A1 | 8/2010 | Chamberlain | |
| 2010/0246645 A1 | 9/2010 | Fenton et al. | |
| 2011/0216910 A1 | 9/2011 | Lee | |
| 2012/0026039 A1 | 2/2012 | Ganeshan et al. | |
| 2014/0177682 A1 | 6/2014 | Yu | |
| 2014/0327576 A1 | 11/2014 | Kumar | |
| 2014/0364078 A1 | 12/2014 | Richley | |
| 2015/0035701 A1 | 2/2015 | Zhang et al. | |
| 2017/0180160 A1 * | 6/2017 | Moorti | H04L 25/0204 |
| 2020/0025572 A1 | 1/2020 | Bobye | |
| 2020/0295849 A1 * | 9/2020 | Li | H04L 25/03343 |
| 2020/0334542 A1 | 10/2020 | Hoydis | |
| 2022/0123770 A1 | 4/2022 | Yu et al. | |
| 2022/0209805 A1 | 6/2022 | Yu et al. | |

FOREIGN PATENT DOCUMENTS

| | | |
|---|---|---|
| CA | 3003298 A1 | 8/2017 |
| EP | 1734377 A1 | 12/2006 |
| EP | 1990917 A1 | 11/2008 |
| EP | 2028762 A1 | 2/2009 |
| EP | 3417315 A1 | 12/2018 |
| EP | 3627190 A1 | 3/2020 |
| EP | 3742201 A1 | 11/2020 |
| ES | 2335199 T3 | 3/2010 |
| ES | 2394849 T3 | 2/2013 |
| JP | 2014204300 A | 10/2014 |
| WO | WO2005071431 A1 | 8/2005 |
| WO | WO2008135513 A1 | 11/2008 |
| WO | WO2014019331 A1 | 2/2014 |
| WO | WO2014175959 A1 | 10/2014 |
| WO | WO2017140601 A1 | 8/2017 |
| WO | WO2018019960 A1 | 2/2018 |
| WO | WO2019091769 A1 | 5/2019 |
| WO | WO2019135019 A1 | 7/2019 |
| WO | WO2022082202 A1 | 4/2022 |
| WO | WO2022082206 A1 | 4/2022 |
| WO | WO2022082211 A1 | 4/2022 |

OTHER PUBLICATIONS

International Search Report and Written Opinion, re PCT Application No. PCT/US21/71877 dated Dec. 14, 2021 (22 pages).

International Search Report and Written Opinion, re PCT Application No. PCT/US21/71886 dated Dec. 14, 2021 (22 pages).

S. C. Pei and C. C. Tseng, Complex Adaptive IIR Notch Filter Algorithm and Its Applications, IEEE Transactions on Circuits and Systems—II: Analog and Digital Signal Processing, vol. 41, No. 2, Feb. 1994, pp. 158-163.

Y. Liu, P.S.R. Diniz, T.I. Laakso, Adaptive Steiglitz-McBride Notch Filter Design for Radio Interference Suppression in VDSL Systems, pp. 359-363.

K. Steiglitz and L.E. McBride, A Technique for Identification of Linear Systems, IEEE Transactions on Automatic Control, vol. AC-10, No. 4, Oct. 1965, pp. 461-464.

International Search Report and Written Opinion, re PCT Application No. PCT/US2022/076187 dated Jan. 4, 2023 (16 pages).

International Search Report and Written Opinion, re PCT Application No. PCT/US2021/072040 dated Jun. 29, 2022 (16 pages).

Di Cintio Andrea et al., The GREHDA Project: Galileo Software Receiver for High Dynamic Applications, GNSS 2007-Proceedings of the 20th International Technical Meeting of the Satellite Division of the Institute of Navigation, Sep. 28, 2007, pp. 2376-2387.

* cited by examiner

ADAPTIVE NARROWBAND INTERFERENCE REJECTION FOR SATELLITE NAVIGATION RECEIVER

RELATED APPLICATION

This document (including the drawings) claims priority and the benefit of the filing date based on U.S. provisional application No. 63/093,161, filed Oct. 16, 2020, and entitled ADAPTIVE NARROWBAND INTERFERENCE REJECTION FOR SATELLITE NAVIGATION RECEIVER under 35 U.S.C. § 119 (e), where the provisional application is hereby incorporated by reference herein.

FIELD OF THE DISCLOSURE

This disclosure document relates to adaptive narrowband interference rejection for a satellite navigation receiver.

BACKGROUND

The electromagnetic spectrum is limited for wireless communications. As wireless communications are engineered to support greater data transmission throughput for end users, the potential for interference to satellite navigation receivers tend to increase. Interference may be caused by various technical factors, such as inadequate frequency spacing or spatial separation between wireless transmitters, intermodulation distortion between wireless signals, receiver desensitization, or deviation from entirely orthogonal encoding of spread-spectrum signals, outdated radio or microwave frequency propagation modeling of government regulators, among others. Accordingly, there is need to ameliorate interference through an adaptive narrowband interference rejection system.

SUMMARY

In accordance with one embodiment, a receiver system with interference rejection, the receiver system comprises an antenna for receiving a radio frequency signal. A downconverter is configured to convert the radio frequency signal to an intermediate frequency signal. An analog-to-digital converter is configured to convert the intermediate frequency signal or an analog baseband signal to a digital baseband signal. A selective filtering module is arranged to filter or process the digital baseband signal, where the selective filtering module comprises a narrowband rejection filter configured to reject an interference component that interferes with the received radio frequency signal. The selective filtering module comprises an adaptive notch filter that supports an infinite impulse response (IIR). A controller is configured to control the adaptive notch filter and to execute a search technique (e.g., artificial intelligence (AI) search technique) to converge on filter coefficients and to recursively adjust the filter coefficients of the adaptive notch filter in real time to adaptively adjust one or more filter characteristics (e.g., maximum notch depth or attenuation, bandwidth of notch, or general magnitude versus frequency response of notch).

BRIEF DESCRIPTION

Figure 7:
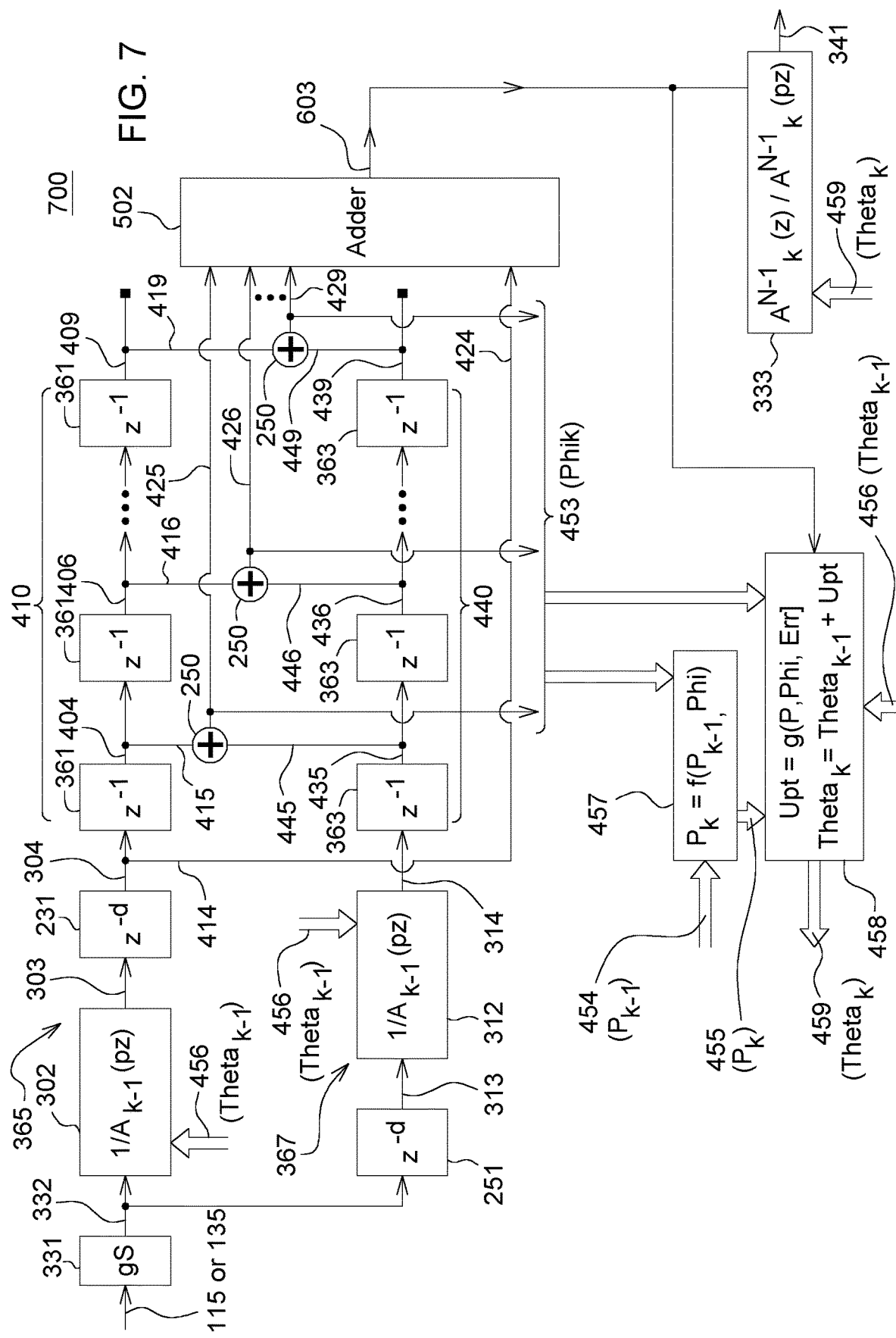

FIG. 7 a block diagram of a third embodiment of a cascaded notch filter architecture that illustrates the feedback of the infinite impulse response configuration consistent with the Steiglitz-McBride approach.

Figure 8:
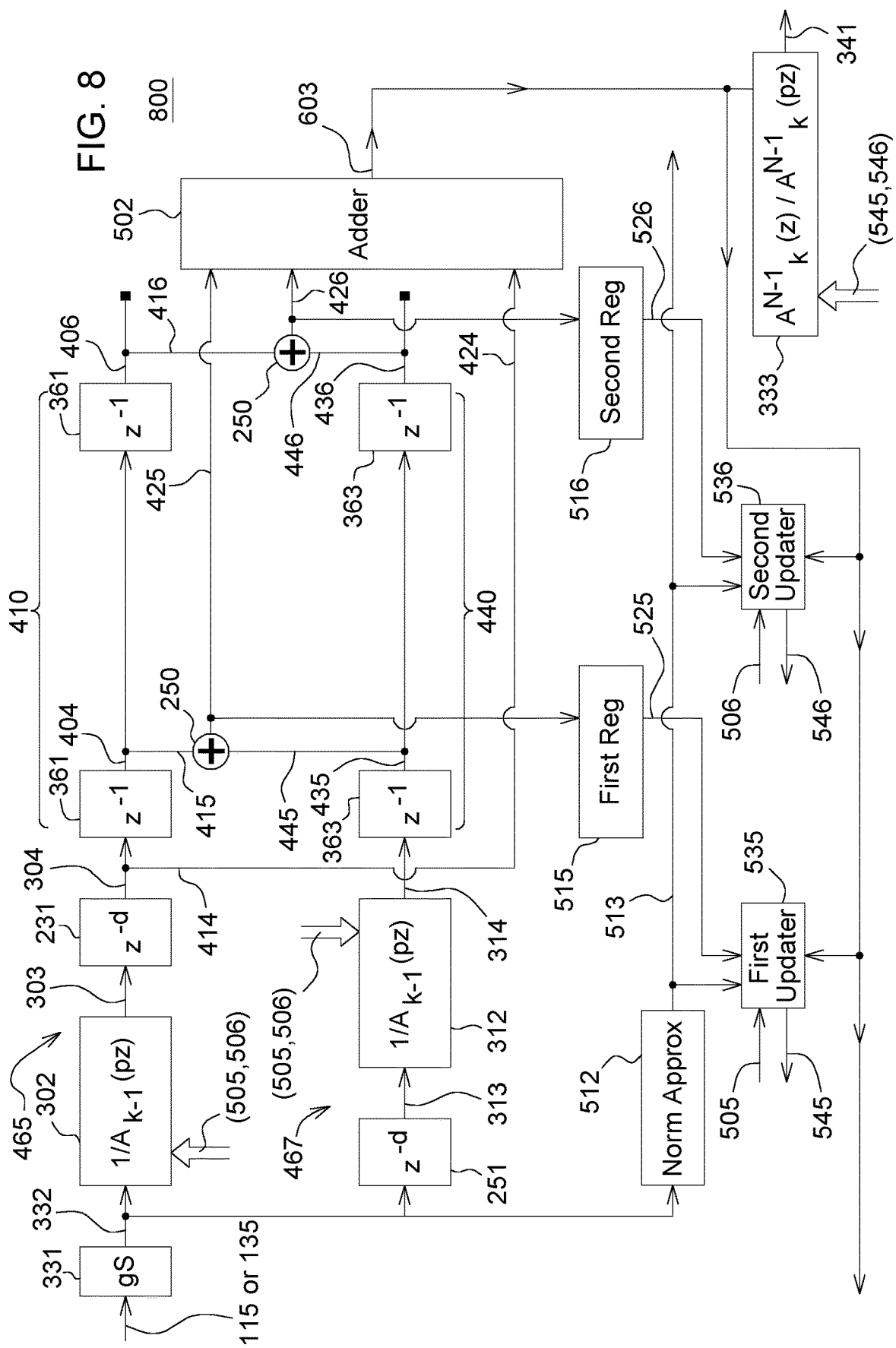

FIG. 8 is a block diagram of a fourth embodiment of a cascaded notch filter that comprises a second order variant of the cascaded notch filter of FIG. 7.

Figure 9:
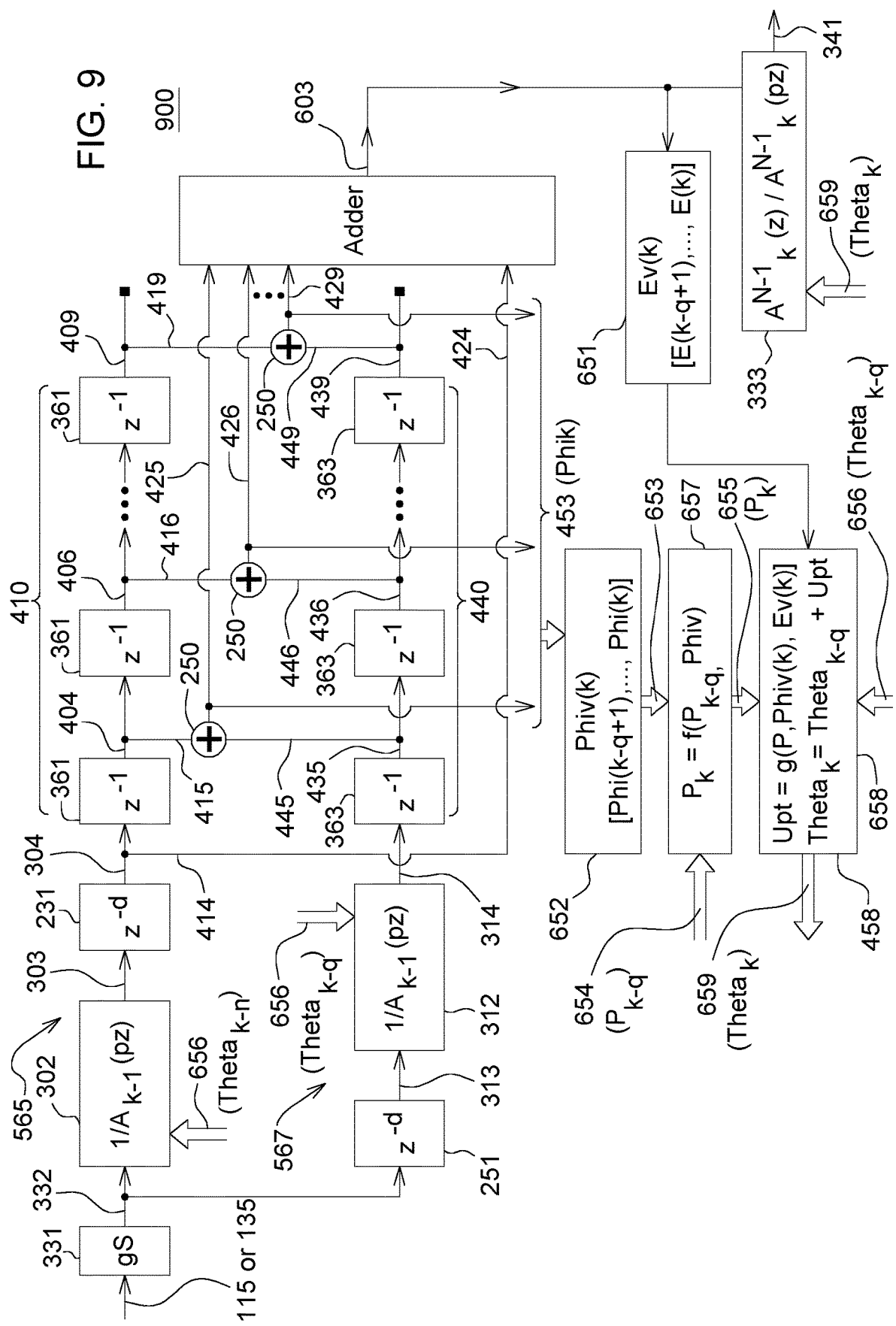

FIG. 9 is a block diagram of a fifth embodiment of a cascaded notch filter based on a mini-batch gradient descent algorithm.

Figure 10:
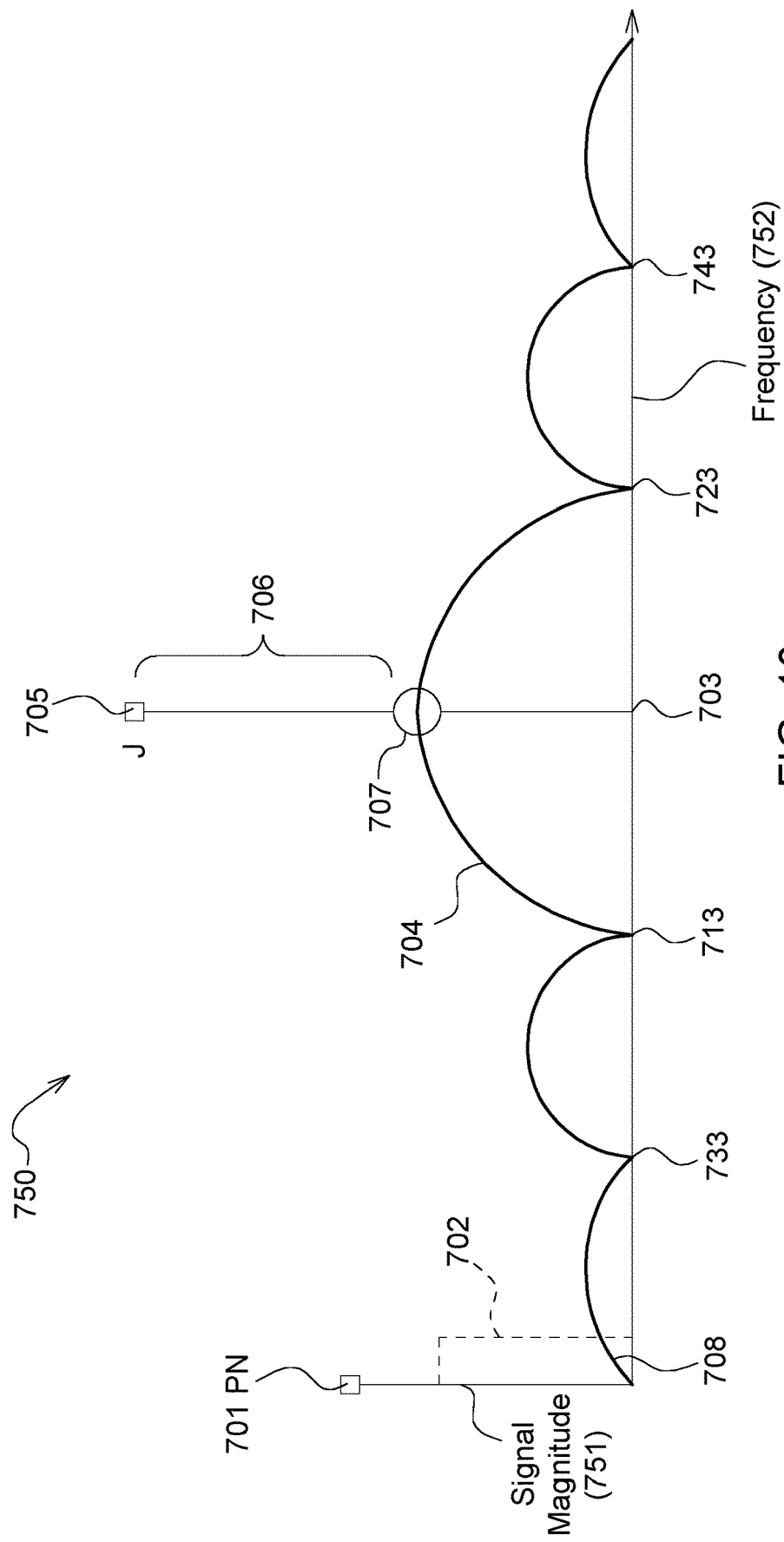

FIG. 10 is a theoretical model to predict the signal to noise ratio degradation associated with an illustrative neighboring band interference signal.

Figure 11:
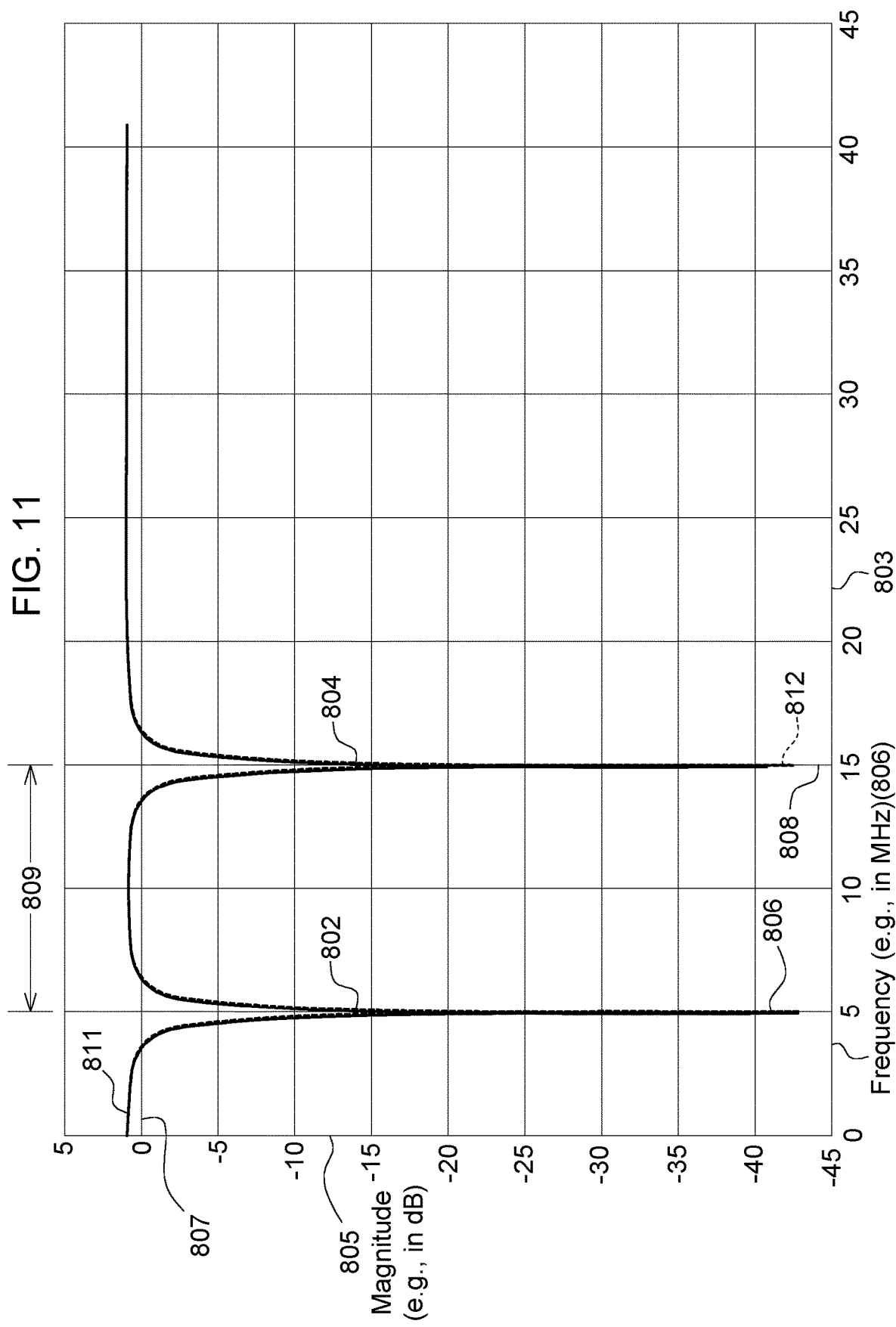

FIG. 11 is an illustrative example of a chart of magnitude versus frequency response of the notch filter, where an adaptive solution and an expected or benchmark solution are compared.

Figure 12:
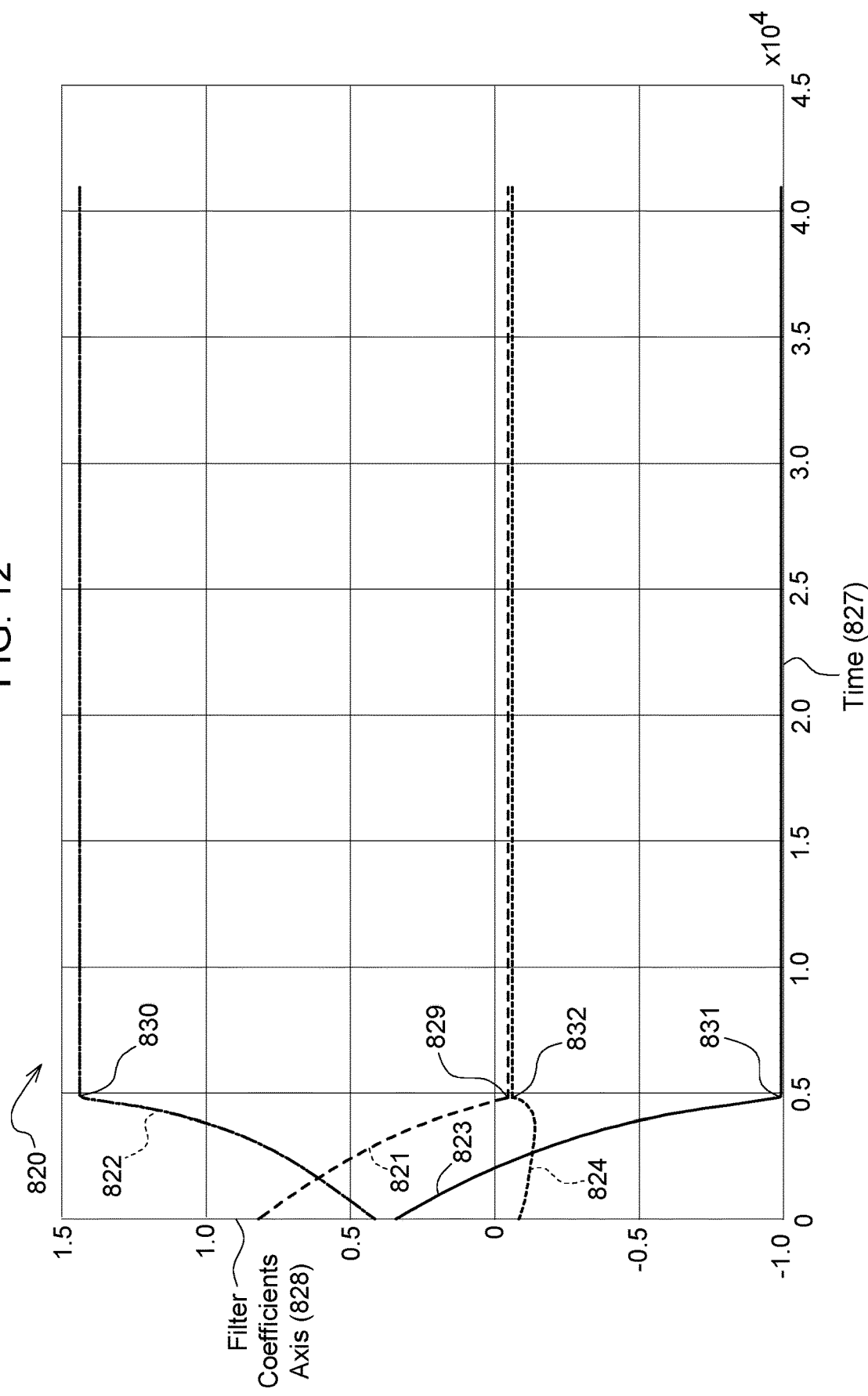

FIG. 12 is an illustrative example of a chart that shows convergence versus time of the filter coefficients to a steady-state solution of filter coefficients as a reference.

Figure 13:
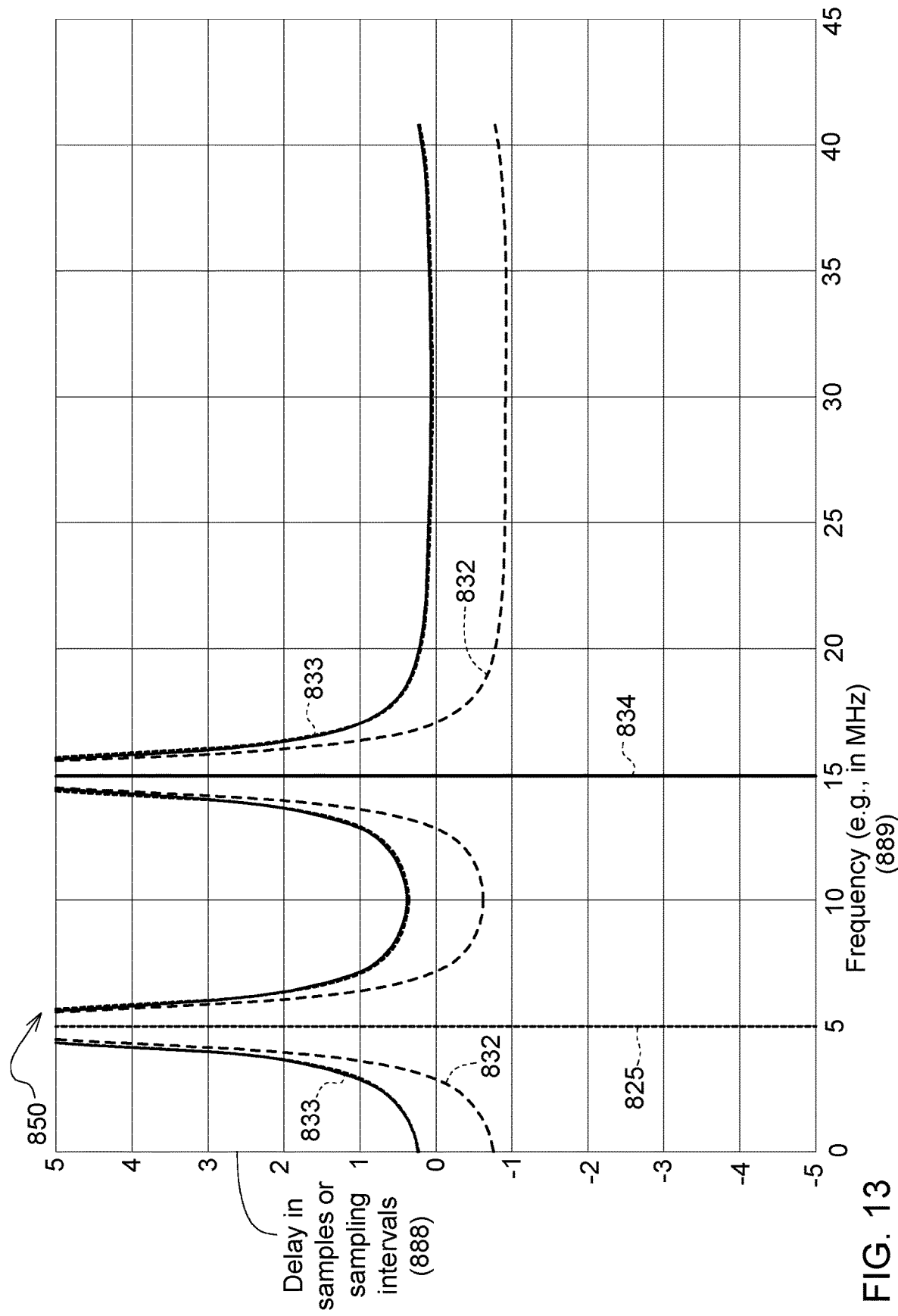

FIG. 13 is an illustrative example of a chart that shows group delay of the notch filter over an extended bandwidth of potential interest.

Figure 14:
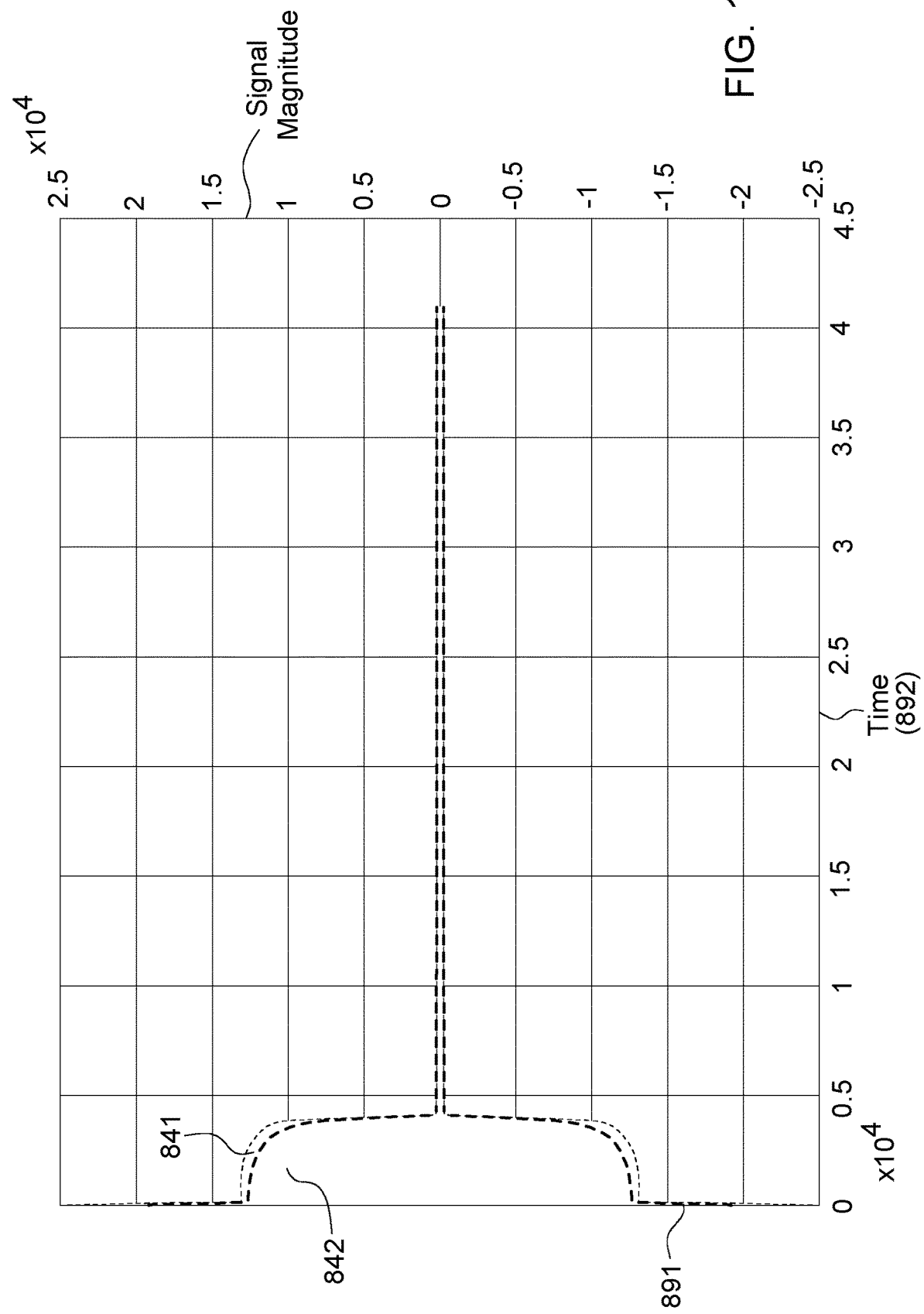

FIG. 14 is an illustrative example of graph of potential filter error in a magnitude of the desired, received signal compared between pre-convergence and post-convergence.

Figure 15:
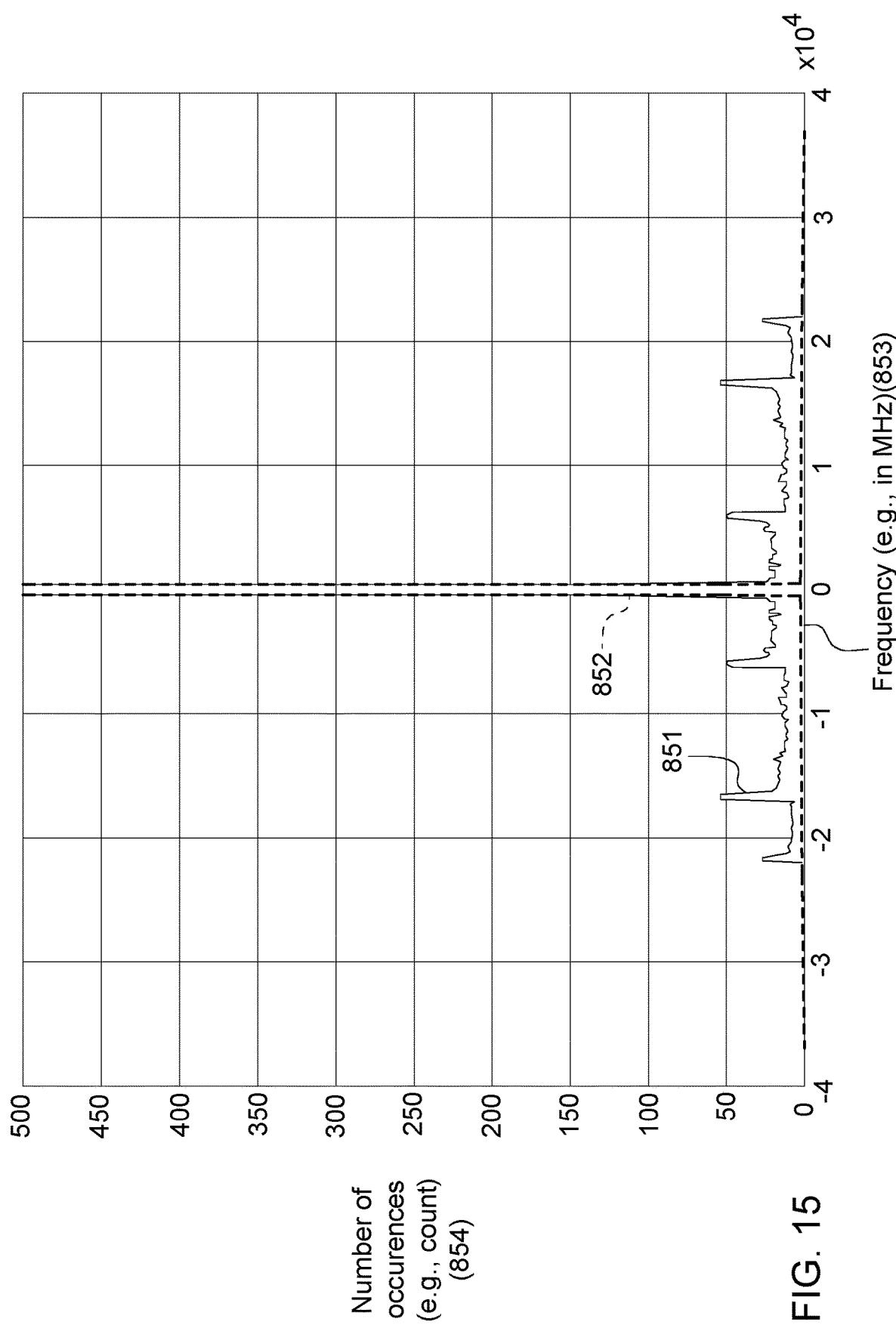

FIG. 15 is illustrative example of histogram of the desired, received signal versus an error signal at a steady state.

DETAILED DESCRIPTION

As used in this document, adapted to, arranged to or configured to means that one or more data processors, logic devices, digital electronic circuits, delay lines, or electronic devices are programmed with software instructions to be executed, or are provided with equivalent circuitry, to perform a task, calculation, estimation, communication, or other function set forth in this document.

An electronic data processor means a microcontroller, microprocessor, an arithmetic logic unit, a Boolean logic circuit, a digital signal processor (DSP), a programmable gate array, an application specific integrated circuit (ASIC), or another electronic data processor for executing software instructions, logic, code or modules that are storable in any data storage device.

As used in this document, a radio frequency signal comprises any electromagnetic signal or wireless communication signal in the millimeter frequency bands, microwave frequency bands, ultra-high-frequency bands, or other frequency bands that are used for wireless communications of data, voice, telemetry, navigation signals, and the like.

Figure 1A:
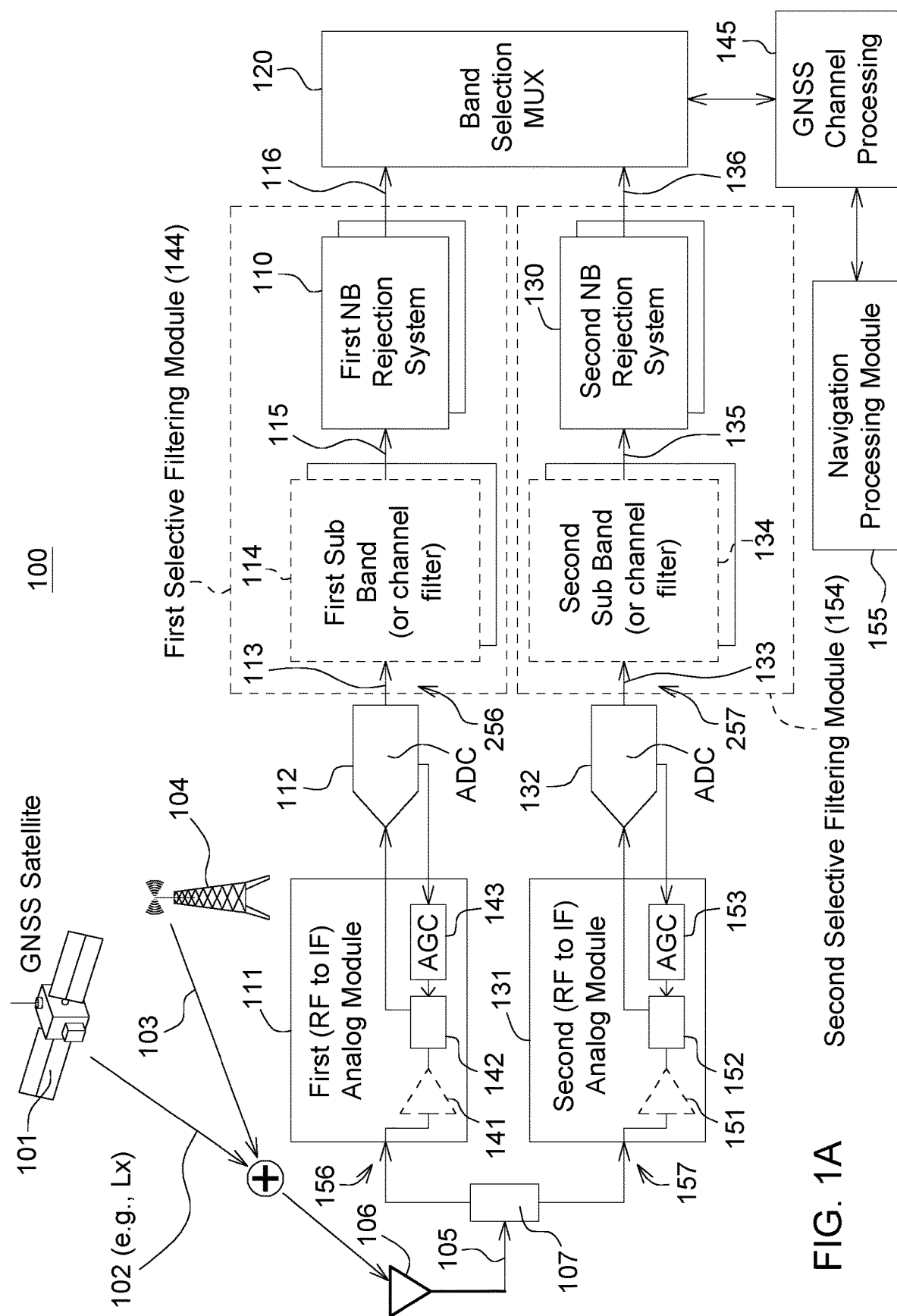
FIG. 1A is a block diagram of a receiver system with digital signal processing for adaptive narrowband interference rejection for radio frequency signal, such as a microwave satellite signal.

FIG. 1A is a block diagram of a receiver system 100 with digital signal processing for adaptive narrowband interference rejection for radio frequency signal, such as a microwave satellite signal 102. A global navigation satellite system (GNSS) comprises a constellation of satellites 101 orbiting around the Earth. Each satellite 101 (e.g., GNSS satellite) comprises a transmitter for transmitting a desired navigation satellite signal 102 or radio frequency signal that can be received by a receiver system 100 (e.g., GNSS receiver system or satellite navigation receiver). Meanwhile, an interfering transmitter 104 may transmit an interference signal 103 on a frequency and with a modulation that has the potential to interfere with the reception of the desired navigation satellite signal 102 of the GNSS receiver.

The receiver system 100 represents an illustrative example of one possible reception environment for a radio receiver such as a global navigation satellite system (GNSS) receiver. The satellite 101 (e.g., satellite vehicle) transmits the satellite signal 102 on multiple frequencies, such that the collective set of signals may be referred to as a composite signal. For example, in FIG. 1A the Lx can represent one or more satellite signals 102, such as L1, L2, and/or L5 signals, that are used in a Global Positioning System (GPS). The satellite signal 102 will be attenuated or disturbed by free space propagation, the ionosphere, and troposphere. In practice, the satellite signal 102 can be impacted by background noise and/or some potential interference signals 103 (e.g., narrowband interference signal). For example, at a terrestrial radio tower, an interfering transmitter 104 may transmit one or more interference signals 103 within the same or adjacent band to one or more transmitted satellite signals 102 from the satellite 101. The interference signal 103 can be classified as either wideband interference (WBI, e.g., a pulse-like signal) or narrowband interference (NBI, e.g., a continuous wave (CW) signal, which bandwidth is relatively narrower than the GNSS signal). The scope of this disclosure will concentrate on reduction or filtering of interference from one or more narrowband interference signals 103, although it may be apparent to those of ordinary skill in the art to adapt the disclosure to wideband interference.

As used herein, the NBI may be synonymous with an NBI component or NBI components.

FIG. 1A shows a receiver system 100 capable of receiving signals transmitted by satellites 101 that include one or more carrier signals (e.g., a first carrier (L1), a second carrier (L2) and an additional third carrier (L5) of the Global Positioning System (GPS)) such that the receiver system 100 can determine position, velocity, and attitude (e.g., yaw, tilt and roll angles) with very high accuracy and precision based on the received signals. The received signals may be transmitted from one or more satellites 101, such as a GPS satellite, a Galileo-compatible satellite, or a Global Navigation Satellite System (GLONASS) satellite. The satellites 101 have approximately known orbital positions versus time that can be used to estimate the relative position between an antenna 106 of the receiver system 100 and each satellite 101, based on the propagation time of one or more received signals between four or more of the satellites 101 and the antenna 106 of the receiver system 100.

Precise point positioning (PPP) includes the use of precise satellite orbit and clock corrections provided wirelessly via correction data, rather than through normal satellite broadcast information (ephemeris and clock data) that is encoded on the received satellite signals, to determine a relative position or absolute position of a mobile receiver. PPP may use correction data that is applicable to a wide geographic area. Although the resulting positions can be accurate within a few centimeters using state-of-the-art algorithms, conventional precise point positioning can have a long convergence time of up to tens of minutes to stabilize and determine the float or integer ambiguity values necessary to achieve the purported (e.g., advertised) steady-state accuracy. Hence, such long convergence time is typically a limiting factor in the applicability of PPP.

In accordance with one embodiment, FIG. 1A illustrates a receiver system 100 with a dual-path receiver configuration. In a dual-path receiver configuration with interference rejection, the receiver system 100 comprises an antenna 106 for receiving a radio frequency signal, such as a microwave frequency satellite signal (e.g., one or more satellite carrier signals from multiple satellites, such as at least four orbiting satellites). The antenna 106 is coupled to a signal splitter 107 that splits the received radio frequency signal into a first radio frequency signal and a second radio frequency signal, where the first radio frequency signal and the second radio frequency signal are generally identical to each other. Further, the first radio frequency signal and the second radio frequency signal are essentially an attenuated version of the received radio frequency signal at an output port 105 of the antenna 106. The splitter 107 may comprise a diplexer, a hybrid splitter 107, a radio frequency transformer, or the like.

Here, a dual band system is described as an example with a first analog signal path 156 corresponding to the first radio frequency signal and a second analog signal path 157 associated with second radio frequency signal, although in other configurations multiple parallel signal paths for corresponding different frequency bands may be used. For example, a dual band system includes a low-band and a high band, where the low-band has a lower frequency range than the high band does. For the Global Positioning System (GPS), the transmitted L1 frequency signal of a satellite 101 may comprise the high band; the transmitted L2 frequency signal may comprise the low band signal. Further, the L1 carrier is at 1,575.42 MHz, which is modulated with the P(Y) code (pseudo random noise code) and M code that occupies a target reception bandwidth on each side of the carrier. Meanwhile, the L2 carrier is at 1,227.6 MHz and modulated with the C/A (coarse acquisition) code, P(Y) code (pseudo random noise code) and M code that occupies a target reception bandwidth on each side of the carrier. The splitter 107 (e.g., diplexer) splits the composite signal into the first signal path (e.g., upper signal path or high-band path) and the second signal path (e.g., lower path or low-band path).

In one embodiment, the signal splitter 107 or hybrid may split the received signal into two received radio frequency signals for processing by a first analog module 111 and a second analog module 131. Each analog module (111, 131) converts the received radio frequency (RF) or microwave frequency signal to an intermediate frequency (IF) signal or analog baseband signal. The first analog module 111 may comprise an optional first pre-amplifier 141 or a low-noise amplifier (LNA) for amplifying the received signal. Similarly, the second analog module 131 may comprise an optional second pre-amplifier 151 or a low-noise amplifier (LNA) for amplifying the received signal. To simplify the receiver analog filtering design, the front-end of a typical modern GNSS receiver uses a wideband front-end design to receive multiple GNSS signals using two/three wideband filters (not shown), where each band targets a target bandwidth (e.g., 140-300 MHz).

In the first analog signal path 156, a first downconverter 142 is configured to convert the (amplified) first radio frequency signal to an intermediate frequency signal. For example, the first analog module 111 comprises a first downconverter 142, such as the combination of a mixer and a local oscillator, which moves the high band (L1, G1, B1, or similar frequency associated with a GNSS) radio frequency (RF) into the intermediate frequency (IF). The first downconverter 142 is coupled to the first analog-to-digital (ADC) converter 112.

In the first analog signal path 156, a first automatic gain control (AGC) 143 is coupled to the first ADC 112 and the first downconverter 142. For example, in one configuration of the first signal path, a first automatic gain control (AGC) 143 is coupled to the first ADC 112, the first downconverter 142, and the first pre-amplifier 141. The first automatic gain control (AGC) 143 may control the gain (e.g., root mean square (RMS) amplitude) of an input signal to the corresponding first analog-to-digital converter (ADC) 112 to be constant or within a target range (e.g., despite fluctuations in ambient radio frequency noise and the interference signal 103). The first AGC 143 receives gain-related feedback from the first ADC 112 to adjust the gain setting of first downconverter 142 (and/or the first pre-amplifier 141).

In the second analog signal path 157, a second downconverter 152 is configured to convert the (amplified) second radio frequency signal to an intermediate frequency signal. For example, the second analog module 131 comprises a second downconverter 152, such as the combination of a mixer and a local oscillator, which moves the low band (L2, or similar frequency associated with a GNSS) radio frequency (RF) into the intermediate frequency (IF).

In the second analog signal path 157, a second automatic gain control (AGC) 153 is coupled to the second analog-to-digital converter (ADC) 132 and the second downconverter 152. For example, in one configuration of the second signal path, a second automatic gain control (AGC) 153 is coupled to the second ADC 132, the second downconverter 152, and the second pre-amplifier 151. The second automatic gain control (AGC) 153 may control the gain (e.g., root mean square (RMS) amplitude) of an input signal to the corresponding second analog-to-digital converter (ADC) 132 to be constant or within a target range (e.g., despite fluctuations in ambient radio frequency noise and the interference signal 103). The second AGC 153 receives gain-related feedback from the second ADC 132 to adjust the gain setting of second downconverter 152 (and/or the second pre-amplifier 151).

Each analog-to-digital converter (ADC) (112, 132) may be coupled to its corresponding automatic gain control (AGC) (143, 153) that provides variable gain amplification. In turn, each AGC is coupled to its corresponding downconverter (142, 152). In one embodiment, the automatic gain control AGC provides a feedback signal to the downconverter (142, 152) or intermediate frequency (IF) filter (e.g., analog IF filter) that is associated with the downconverter. The downconverter (142, 152) or its analog IF filter adapts the signal voltage (pea-to-peak) within the first ADC 112 to be commensurate with its operational range.

In one embodiment, each ADC (112, 132) samples the analog received signal (from the corresponding downconverter (142, 152)) using a predefined sampling rate, which, per Nyquist theorem, should be equal to or greater than two times the bandwidth (e.g., target reception bandwidth) for the practical sampling design. The bandwidth of the ADC determines maximum tolerable interference at a given quantization loss. The resulting digital sequence or filter input (113, 133) reconstructs the received signal, such as the first signal (e.g., high-band RF signal) and the second signal (e.g., low-band RF signal) to the baseband signal with a corresponding baseband bandwidth or range.

In terms of the AGC feedback control from its respective ADC (112, 132), the AGC feedback control can be done either in analog or digital domain. For example, an envelope detector is typically used for AGC and variable gain control if analog control is used. Because of advances in digital processing theory and practice, the digital processing for the AGC feedback control, can be based on a statistical processes, such as digital analysis of a histogram of the sample digital stream (or filter inputs 113, 133) at the output of the corresponding analog-to-digital converter, ADC (112, 132) to generate a feedback signal to control the AGC (143, 153), such as the first AGC 143 associated with the corresponding first analog signal path 156 and the second AGC 153 associated with the second analog signal path 157. Each AGC is coupled to the downconverter (142, 152), which in practice may comprise the downconverter and IF filter module with inherent gain/amplification adjustments.

A first analog-to-digital converter 112 is configured to convert the analog intermediate frequency signal to a digital intermediate frequency signal, or to convert an analog baseband signal to a digital baseband signal. A first selective filtering module 144 is arranged to filter or process the digital baseband signal, where the first selective filtering module 144 may comprise a first sub-band filter 114 (e.g., pass-band filter) and first narrowband rejection system 110 configured to reject an interference component that interferes with the received radio frequency signal (e.g., associated with a first sub-band or set of channels).

In one embodiment, the selective filtering module (144, 154) comprises an adaptive notch filter that supports an infinite impulse response (IIR). Within the selective filtering module (144, 154), in one embodiment an electronic controller or electronic data processor is configured to control the adaptive notch filter and to execute a search technique (e.g., artificial intelligence (AI) search technique) to converge on filter coefficients and to recursively adjust the filter coefficients of the adaptive notch filter in real time to adaptively adjust one or more filter characteristics (e.g., maximum notch depth or attenuation, bandwidth of notch, or general magnitude versus frequency response of notch).

In a first digital signal path 256, a first selective filtering module 144 comprises a first narrowband rejection system 110, such as an adaptive notch filter that supports an infinite impulse response (IIR). A controller is configured to control the first adaptive notch filter and to execute a search technique (e.g., artificial intelligence (AI) search technique) to converge on first filter coefficients and to recursively adjust the first filter coefficients of the first adaptive notch filter in real time to adaptively adjust one or more filter characteristics (e.g., maximum notch depth or attenuation, bandwidth of notch, or general magnitude versus frequency response of notch).

In a second digital signal path 257, a second analog-to-digital converter 132 is configured to convert the analog intermediate frequency signal to a digital intermediate frequency signal, or to convert an analog baseband signal to a digital baseband signal. A second selective filtering module 154 is arranged to filter or process the digital baseband signal, where the second selective filtering module 154 may comprise a second sub-band filter 134 (e.g., bass-band filter) and second narrowband rejection system 130 configured to reject an interference component that interferes with the received radio frequency signal (e.g. associated with a second sub-band or a second set of channels).

The second selective filtering module 154 comprises a second narrowband rejection system 130, such as an adaptive notch filter (e.g., one or more adaptive notch filters) that supports an infinite impulse response (IIR). In the second selective filtering module 154, an electronic controller or electronic data processor is configured to control the second adaptive notch filter and to execute a search technique (e.g., artificial intelligence (AI) search technique) to converge on second filter coefficients and to recursively adjust the second filter coefficients of the second adaptive notch filter in real time to adaptively adjust one or more filter characteristics (e.g., maximum notch depth or attenuation, bandwidth of notch, or general magnitude versus frequency response of notch).

A selective filtering module, such as a first selective filtering module 144 or a second selective filtering module 154, is arranged to filter or process the digital baseband signal, where the filtering module may comprise one or more of the following: (a) a first sub-band filter 114 or first channel filter, such as a pass-band filter to filter signals outside a target reception bandwidth; (b) a first narrow band rejection system 110, such as a narrowband rejection filter configured to reject an interference component at a target rejection frequency or within a target rejection bandwidth that interferes with the received radio frequency signal; (c) a second sub-band filter 134 or second channel filter, such as a pass-band filter to filter signals outside a target reception bandwidth; (d) a second narrowband rejection system 130, such as a narrowband rejection filter configured to reject an interference component at a target rejection frequency or within a target rejection bandwidth that interferes with the received radio frequency signal. For example, within each selective filtering module (144, 154) or each sub-band filter (114, 134), such as a bandpass filter (BPF) attenuates or rejects the image band of the mixer output of the downconverter (142, 152), or frequencies outside of the target reception bandwidth of the received signal about its central carrier.

The first selective filtering module 144 comprises a first sub-band filter 114 (e.g., digital GNSS band filter) that extracts the targeted component or digital signal from the first signal (e.g., high-band signal or whole high band spectrum) at a first node that corresponds to filter input 113. At the terminal of the output signal 115 of the first sub-band filter 114, the first resultant signal comprises a GNSS signal at a band of interest (e.g. L1 or G1 or B1), the narrowband interference (NBI), and the noise; the wide-band interference (WBI). Similarly, the second selective filtering module 154 comprises a second sub-band filter 134 (e.g., digital GNSS band filter) that extracts the targeted component or digital signal from the second signal (e.g., low-band signal or whole low band spectrum) at a second node that corresponds to filter input 133. At the terminal of the output signal 135 of the second sub-band filter 134, the second resultant signal comprises a GNSS signal at a band of interest (e.g. L2 or G2 or B2), the narrowband interference (NBI), and the noise; the wideband interference (WBI). The WBI mitigation is not addressed directly in this disclosure, although certain filtering techniques may have general applicability to both NBI and WBI.

In one example, a relatively strong NBI component in signal 115 will lead to the signal-to-noise ratio (SNR) degradation. In practice, such SNR degradation is significantly determined by the relative location of NBI reference to the pseudorandom noise (PN) modulated radio frequency signal in the frequency domain and the de-spreading gain that a specific PN sequence provides. The quantity analysis of such impact on SNR degradation or receiver performance will be discussed later in this disclosure.

To mitigate the impact of the NBI on the PN sequence demodulation performance, the first narrowband rejection system 110 (e.g., with one or more adaptive notch filters) adaptively rejects the NBI. As shown in FIG. 1A, the first narrowband rejection system 110 is coupled to the output signal 115 of the first sub-band filter 114. The first narrowband rejection system 110 filters the first signal to reject NBI in the first signal (e.g., in the first digital signal path 256).

Similarly, the second narrowband rejection system 130 (e.g., that comprises one or more adaptive filters) filters the second signal to reject NBI in the second signal. As shown in FIG. 1A, the second narrowband rejection system 130 is coupled to the terminal of the output signal 135 of the second sub-band filter 134. The second narrowband rejection system 130 filters the second signal to reject NBI in the second signal (e.g., in the second digital signal path 257).

At the output of each narrow band rejection system (110, 130), the residual signal (116, 136), ideally, contains only the PN signal and the noise because the NBI would be completely eliminated. In practice, the NBI will be attenuated, reduced or ameliorated in the PN signal based on the performance of the embodiments of the adaptive filtering algorithms described in this disclosure.

As shown in FIG. 1A, the first selective filtering module 144 comprises one or more of the following associated with a first digital signal path 256: (a) a first sub-band filter 114, such as a first channel filter or a first bandpass filter for filtering a first target reception bandwidth (e.g., GNSS sub-band for L1 or L2 signal), and (b) a first narrow band rejection system 110, such as first adaptive narrow band interference rejection filter. The second selective filtering module 154 comprises one or more of the following associated with a second digital signal path 257: (a) a second sub-band filter 134, such as a second channel filter or a second bandpass filter for filtering a second target reception bandwidth (e.g., GNSS sub-band for L1 or L2 signal), and (b) a second narrow band rejection system 130, such as a second adaptive narrow band interference rejection filter.

Equivalently, to its counterpart along the first signal path (e.g., the upper signal path), the second signal path (e.g. the lower signal path) from splitter 107 (e.g., coupler) is processed by the second down-converter 152, which comprises an IF filter (e.g., analog IF filter). The second downconverter 152 is coupled to the second ADC 132. The second AGC 153 is coupled between the second ADC 132 and the second downconverter 152 for adjusting the gain or scaling the input signal to the second ADC 132. At the output of the second ADC 132, the second resultant digital stream represents the low-band RF signal at baseband range. The bandpass selective filtering extracts the signal from a targeted band (e.g. L2, L5 etc.). The second NB rejection system 130 (e.g., second NBI rejection system) is added to mitigate the PN demodulation degradation on the targeted band. This disclosure describes illustrative or possible designs (and respective estimated or modeled performance) to the first narrowband rejection system 110 and the second narrowband rejection system 130.

A band-selection multiplexor (MUX) 120 is coupled to the output of the first narrowband rejection system 110 (e.g., first adaptive narrow band rejection filter) and the second narrowband rejection system 130 (e.g., the second adaptive narrow band rejection filter) to select the digital sample stream or channel that represents the first signal or the second signal, where each signal may be modulated with or encoded with target PN sequence or another encoding scheme. For example, the band-selection multiplexer selects the first signal, the first channel or L1 band if the targeted PN sequence type is GPS L1 CA.

The appropriate sample stream will be further processed by the GNSS channel processing module 145, which typically comprises: one or multiple carrier phase demodulators, a replica or local PN code generator sampled at multiple delayed phases, banks of correlators, and multiple accumulators, to create a bank of in-phase (I) and quadrature (Q) measurements at an interval of millisecond (ms) or multiple milliseconds to drive the baseband tracking loop.

Further, in some embodiments the GNSS channel processing module 145 may further comprise a binary offset sub-carrier (BOC) modulator (used for modern GNSS signal such as GPS L1C, BeiDou B1C, Galileo E1 signals etc.).

In one embodiment, the GNSS channel processing module 145 may comprise a baseband tracking loop module for tracking of code phase and carrier phase. For example, the baseband tracking loop module derives correction or control signals to control a local oscillator or the numerically controlled oscillators (NCOs) in the GNSS signal processing module to maintain the synchronization between the received signal in the channel and the local replica of that channel with respect to code phase and carrier phase. A GNSS processing module 145 is coupled to a navigation processing module 155.

In one embodiment, the navigation processing module 155 takes a pseudo-range measurements and carrier phase measurements and other related information from the satellites 101 to generate the positioning solution, which is used as a feedback to align the receiver crystal-grade clock (e.g., of lower temporal precision) with the satellite-based atomic grade clock (e.g., of higher temporal precision); the solution also, combined with other information, generates the in-view satellites 101 list to control the appropriate receiver resource allocation.

Figure 1B:
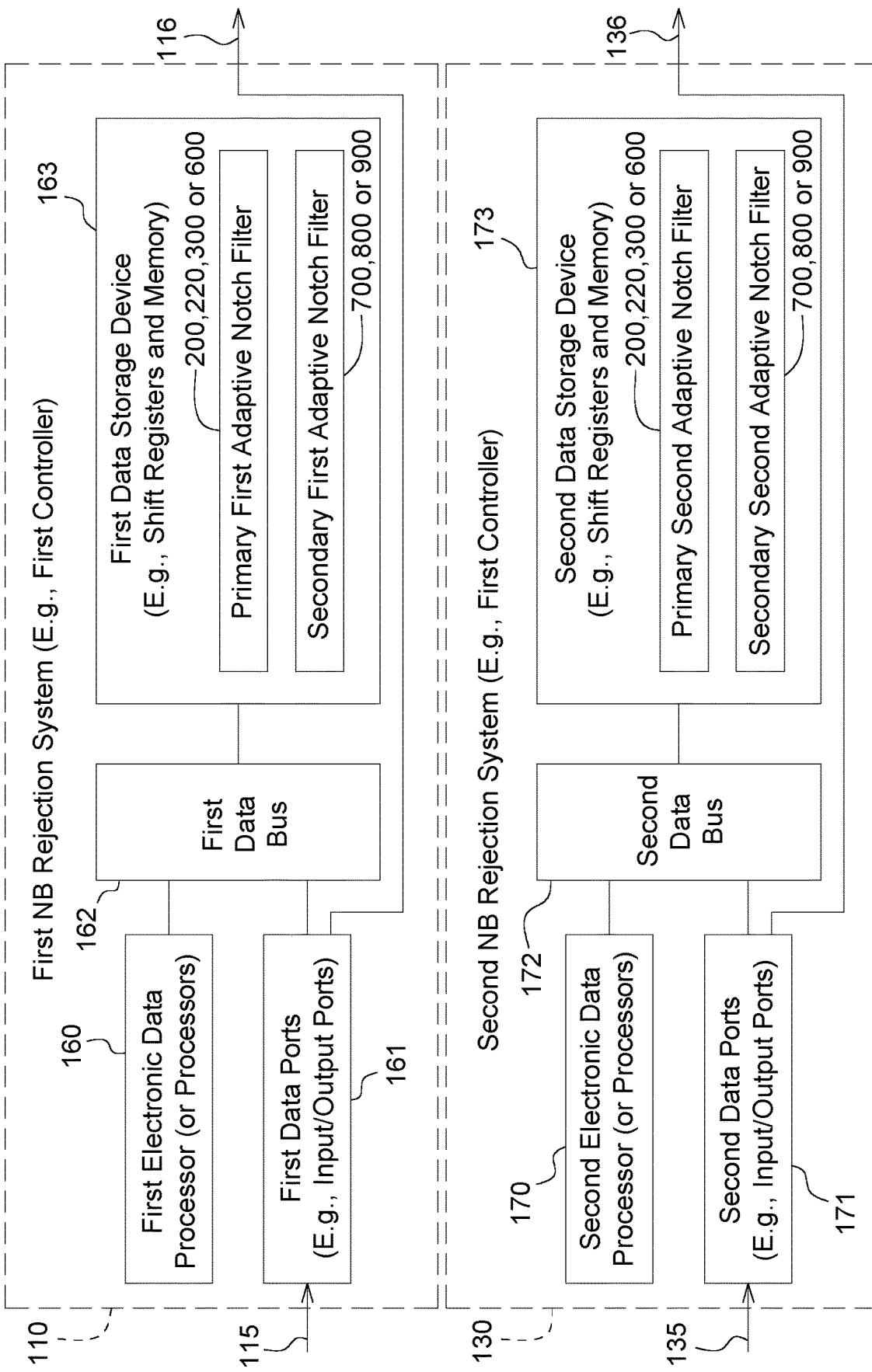
FIG. 1B is a block diagram a first narrow band rejection system and a second narrow band rejection system of FIG. 1A in greater detail.

FIG. 1B is a block diagram a first narrowband rejection system 110 and a second narrowband rejection system 130 of FIG. 1A in greater detail.

In FIG. 1B, the first narrowband rejection system 110 comprises a first electronic data processor 160, a first data ports 161, and first data storage device 163 coupled to a first data bus 162. The first electronic data processor 160, the first data ports 161 and first data storage device 163 may communicate data messages with each other via the first data bus 162, for example. In one embodiment, the first data storage device 163, may store filter parameters, filter coefficients, reference filter parameters, reference filter coefficients, and software instructions relative to adaptive filters, predictive filters, least minimum squares (LMS) search algorithms for filter parameters and filter coefficients, minimum mean square error (MMSE) search algorithms for filter parameters and filter coefficients, Steiglitz-McBride models for estimating or determining filter parameters and filter coefficients, and modified Steiglitz-McBride models for estimating or determining filter parameters and filter coefficients. As illustrated, the first data storage device 163 may store software instructions or software module related to a primary adaptive notch filter (200, 220, 300 or 600) and a secondary adaptive notch filter (700, 800 or 900), such as primary first adaptive notch filter and a secondary first adaptive notch filter, respectively.

In alternate embodiments, alone or cumulative with the above primary first adaptive notch filter and the secondary first adaptive notch filter, the first data storage device 163 may store program instructions for any of the following: (a) filter emulation; (b) initializing, estimating, updating, resetting, storing and retrieving filter coefficients and filter parameters; (c) configuring, controlling, communicating operating digital circuitry (e.g., digital signal processor coupled to the first data ports 161) comprising delay lines, summers, shift registers, adders, and other digital components.

In FIG. 1B, the second narrow band rejection system 130 comprises a second electronic data processor 170, a second data ports 171, and second data storage device 173 coupled to a second data bus 172. The second electronic data processor 170, the second data ports 171 and second data storage device 173 may communicate data messages with each other via the second data bus 172, for example.

In one embodiment, the second data storage device 173, may store filter parameters, filter coefficients, reference filter parameters, reference filter coefficients, and software instructions relative to adaptive filters, predictive filters, least minimum squares (LMS) search algorithms for filter parameters and filter coefficients, minimum mean square error (MMSE) search algorithms for filter parameters and filter coefficients, Steiglitz-McBride models for estimating or determining filter parameters and filter coefficients, and modified Steiglitz-McBride models for estimating or determining filter parameters and filter coefficients. As illustrated, the second data storage device 173 may store software instructions or software module related to a primary adaptive notch filter (200, 220, 300 or 600) and a secondary adaptive notch filter (700, 800 or 900), such as a primary second adaptive notch filter and a secondary second adaptive notch filter, respectively.

In alternate embodiments, alone or cumulative with the above primary second adaptive notch filter and the secondary second adaptive notch filter, the second data storage device 173 may store program instructions for any of the following: (a) filter emulation; (b) initializing, estimating, updating, resetting, storing and retrieving filter coefficients and filter parameters; (c) configuring, controlling, communicating operating digital circuitry (e.g., digital signal processor coupled to the second data ports 171) comprising delay lines, summers, shift registers, adders, and other digital components.

Within the second data storage device 173, filter parameters, filter parameters and filter emulation, delay lines, summers, shift registers, adders, and other structures may be configured. As illustrated, the data storage device comprises a primary second adaptive notch filter and a secondary second adaptive notch filter.

In FIG. 1B, the first electronic data processor, the second electronic data processor, or both may comprise one or more electronic data processors. Each electronic data processor comprises one or more of the following: a microprocessor, a multi-core microprocessor, a microcontroller, a programmable logic device, a programmable gate array, an arithmetic logic unit, a Boolean logic unit, an electronic logic circuit or system, a digital circuit, a digital signal processor (DSP), and application specific integrated circuit (ASIC) or another data processing device. In one embodiment, the electronic data processor can execute software instructions stored in the data storage device 46. For example, the electronic data processor can execute software instructions to facilitate, support, incorporate, call, configure or emulate any of the following: digital delay lines, shift registers, memory registers, memory stacks, summers, adders, digital filter components, a digital notch filter, predictive or adaptive filter modules, filter parameters, filter coefficients, and artificial intelligence (AI) based control of adaptive filters.

In FIG. 1B, the first data storage device, the second data storage device or both may comprise one or more data storage devices. Each data storage device may comprise one or more of the following: electronic memory, nonvolatile electronic memory, shift registers, memory stacks, delay lines, registers, nonvolatile random access memory, a magnetic storage device, an optical storage device, or any other device for storing and retrieving digital data and/or analog data.

The first data ports 161 and second data ports 171 may comprise one or more of the following data ports or input/output data ports. Each data port (161, 171) may comprise a buffer memory and an electronic transceiver for communicating data messages to a network element or via a communications network, such as the Internet or a wireless communications network (e.g., cellular phone network, or high-bandwidth smartphone data communications wireless network).

In one embodiment, in the first digital signal path 256, the first data ports 161 may support the receipt and data processing of digital baseband signals from the first ADC 112 in the first selective filtering module 144. Meanwhile, in the second digital signal path 257, the second data ports 171 may support the receipt and data processing of digital baseband signals from the second ADC 132 in the second selective filtering module 154.

In alternate embodiments, one or more nearby particular receiver systems 100 (e.g., GNSS receivers) may be associated with first wireless communication devices that transmit or share filter coefficients and/or geographical locations associated with NBI at that nearby particular GNSS receivers that are associated with second wireless communication devices, where the wireless communication devices are coupled to the first data ports, the second data ports, or both.

Figure 2A:
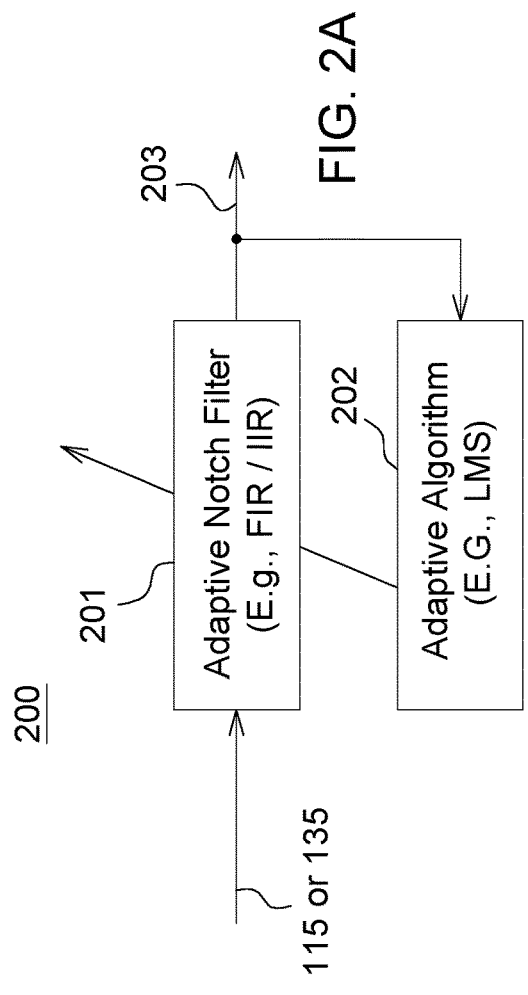
FIG. 2A is a block diagram of an adaptive notch filter using a least minimum squares (LMS) technique to select, tune and/or adjust filter coefficients in real time based on a received signal that includes interference or an interfering signal component.

In FIG. 2A, a block diagram represents a mathematical model of a primary adaptive notch filter 200, such as an adaptive NBI filter or adaptive NBI rejection system that comprises an adaptive notch filter 201 in communication with an adaptive control module 202 that is configured to execute software instructions or an algorithm, such as a least mean square (LMS) algorithm, or alternately or cumulatively, a Steiglitz-McBride (SM) algorithm, or a quasi-Steiglitz-McBride (QSM) algorithm. For example, in a least-mean-square (LMS) mode the adaptive control module 202 or electronic data processor (160, 170) searches for suitable filter coefficients for the adaptive notch filter that minimize the error in the desired frequency response or notch. For example, the LMS mode supports searching candidate filter coefficients until the adaptive control module 202 converges an optimal or final solution of a suitable, final or optimal filter coefficient that minimizes error in the frequency response or notch for a corresponding epoch of the GNSS system or a sampling time interval associated with the received satellite signal. The adaptive notch filter 201 may comprise a finite impulse response filter, or an infinite impulse response filter, or a hybrid filter that serially or sequentially (e.g., in any order) applies a finite impulse response filter and an infinite impulse response filter, to realize the notch filter to reject or attenuate a narrow band interference component. The adaptive notch filter 201 typically receives an input signal from a first sub-band filter 114 (e.g., first bandpass filter) of the first selective filter module 144 or the second sub-band filter 134 (e.g., second bandpass filter) of the second selective filter module 154. The adaptive control module 202 can sample or evaluate the output of the adaptive notch filter 201 to adjust or determine the optimal, final or suitable filter coefficients for the adaptive notch filter 201 for a corresponding GNSS epoch or sampling interval of the received signal (e.g., received GNSS satellite signal).

As used throughout this document, an epoch refers to a measurement time period or interval of a global navigation satellite system (e.g., GNSS) receiver, such as a Global Positioning System (GPS) receiver. For example, an epoch may be associated with one or more sampling intervals of carrier phase measurements of a GNSS receiver 100 or its navigation processing module 155; or corresponding states of a predictive filter, like a Kalman filter, for estimating position, velocity or attitude of the GNSS receiver system 100 (e.g., GNSS receiver). An epoch can be referenced to a universal time or universal satellite-based time, with a temporal offset.

As used in this document a quasi-Steiglitz-McBride (QSM) algorithm, module, process or mode may represent one or more of the following algorithms, modules, processes or modes, together with Steiglitz-McBride algorithm, module, process or mode: (a) a least mean square (LMS) algorithm module, processor or mode; (b) a minimum-mean-square-error (MMSE) module, processor or mode; and (c) a hybrid or dual mode comprising the Steiglitz-McBride (SM) algorithm, module, process or mode and the least mean square (LMS) algorithm module, processor or mode, or the minimum-mean-square-error (MMSE) module, processor or mode, or all three. For example, the QSM mode may support operation of the SM estimator in the SM mode if the convergence period after initialization is lesser than a threshold time period (e.g., to achieve convergence of the filter coefficients via a regression process applicable to the infinite impulse response filter model of the adaptive notch filter). Alternately, the QSM mode may support operation of the SM estimator outside of the SM mode, such as within an LMS mode or MMSE mode, if the convergence period after initialization is lesser than a threshold time period (e.g., to achieve convergence of the filter coefficients via a regression process applicable to the infinite impulse response filter model of the adaptive notch filter).

In FIG. 2A, the adaptive notch filter 201 is associated with filter coefficients that establish a target frequency response that rejects NBI. For example, the adaptive notch filter 201 is associated with filter coefficients that establish a notch (e.g., an attenuation region or attenuation versus frequency response) in a frequency spectrum of the received NBI (e.g., for any given GNSS epoch), where the notch or signal attenuation is associated with a generally narrow frequency range of the NBI or a notch center frequency. The notch may be measured in decibels of attenuation relative to the desired signal or target received signal, for example.

In one embodiment in FIG. 2A in the LMS mode, the primary adaptive notch filter 200 (e.g., adaptive notch filter (ANF)) comprises an adaptive control module 202 that uses a least mean square (LMS) algorithm to adjust recursively or iteratively the filter coefficients of the adaptive notch filter 201 (e.g., adaptive notch filter module). For example, in the LMS mode the suitable, optimal or final filter coefficients are adjusted to minimize error in the frequency response of the adaptive notch filter 201 such that the steady-state (SS) frequency response of adaptive notch filter 201 attenuates the power at NBI frequencies while passing information over other frequencies.

In FIG. 1A, FIG. 1B, or FIG. 2A, the adaptive notch filter 201, the first narrowband rejection system 110, or the second narrowband rejection system 130 can be configured as a finite impulse response (FIR) or an infinite impulse response (IIR). The IIR filter typically has feedback from its output to drive the selection of filter coefficients, which can rapidly provide a sharp filter response with minimal data processing of the data processor. The FIR type model can be regarded as a special case of the IIR architecture discussed in this disclosure, but the FIR filter is usually more computationally intensive. Moreover, compared with the FIR architecture, the IIR architecture can provide a pre-emphasis filtering to enhance temporarily the NBI for detection purposes, which improves the NBI estimation embedded in the noise. The temporary enhancement may be referred to as an adaptive line enhancer (ALE) and is embedded in the adaptive notch filter. Accordingly, the IIR filer configuration with he ALE facilitates improved estimation of NBI components to improve prediction of the filter coefficients; hence, minimizes the residual interference component in the filter output signal 203 (e.g., output samples), or filter output of FIG. 2A.

In one embodiment, the adaptive control module may further comprise a predictive module. A complex IIR-base adaptive notch filter (ANF) algorithm can use a Gauss-Newton type algorithm to align or synchronize the notch frequency or ANF indentation frequency with the NBI. In steady state (SS) mode the predictive module or electronic data processor (160, 170) evaluates the stored signals sampled at the previous epoch of the receiver system 100 to accurately predict the NBI component, such as the NBI center frequency or NBI bandwidth, of the received signal of the receiver system 100 sampled at current epoch. Accordingly, the predictive module can drive the selection of filter coefficients that minimize error in the notch filter response compared to the NBI component with its corresponding predicted NBI center frequency or corresponding predicted NBI bandwidth. Further, in one implementation, the digital adaptive notch filter (e.g., 200, 220, 300, 600, 700, 800, or 900) can simply subtract the prediction from the current sample to realize the notch. After the subtraction, the resultant signal contains only the pseudo-random noise (PN) signal, the uncompensated residual of NBI, and noise (e.g., associated with background noise, white noise, or the noise floor).

To the extent that the adaptive notch filter 201 is configured as an IIR filter, the IIR filter can be susceptible to stability risks. The adaptive control module 202 may be configured to use the Steiglitz-McBride (SM) model, alone or in conjunction with the predictive filter module. The adaptive control module 202 may operate in the LM mode, or the SM mode, or a hybrid mode that includes both the LM mode or the SM mode for certain corresponding GNSS epochs, for example.

If the adaptive control module operates 202 in the SM mode, it is well suited for promoting the efficiency and convergence stability of the IIR configuration of the adaptive notch filter. The SM algorithm introduces an iterative solution, per the criteria of minimum-mean-square-error (MMSE), rather the LMS. The SM IIR model is associated with solving optimal regression equations that are highly nonlinear and intractable. However, a de-correlated two path model can be used convert the estimation of an auto-regression (AR) model into a combination of two moving average (MA) models, among other things. The equations set forth in this disclosure facilitate the technical details to solve efficiently the regression equations in the context of an adaptive notch filter based on the SM model and IIR adaptive filter configuration.

In FIG. 2A, the adaptive notch filter 201 receives an input signal (e.g., 115, 135 in FIG. 1A) which in this illustrative example may comprise a carrier modulated by a PN sequence, the receiving system noise, and the NBI. The adaptive notch filter 201 (e.g., adaptive notch filter module) can be incorporated into the first narrowband rejection system 110 and the second narrowband rejection system 130, or both.

In one example, the adaptive notch filter 201 may be based on the autoregressive-moving-average (ARMA) or moving average (MA) model, either of which can create attenuation at NBI center frequency to mitigate the NBI impact on the PN sequence demodulation. The ARMA model provides two polynomials to model a process including: (1) an autoregression polynomial and (2) a moving average (MA) polynomial. The adaptive notch filter 201 can adapt its notch frequency per the NBI component in signal (e.g., 115, 135) to minimize the NBI component. Regardless of whether the adaptive filter control module 202, uses the MA or ARMA model to control the adaptive notch filter 201, the concept is to minimize the total power (e.g., hence, minimizing total noise power indirectly) of the filter output signal 203; hence, mitigate or eliminate an NBI.

The adaptive control module 202 receives a filter output signal 203 of the adaptive notch filter 201 to derive an error signal that can be used by the least mean square (LMS) or recursive least square (RLS) algorithm to adjust the filter coefficients of the adaptive filter 201 (e.g., adaptive notch filter module). That is, the output signal includes an error signal component or quasi-noise component. In the steady-state (SS) mode, the error signal will be noise like. Therefore, for the SS mode, the mean adjustment by the adaptive control module 202 is "zero" and the filter coefficients of adaptive notch filter have converged to a stable state. Equation 1 provides a unified model to both FIR-based adaptive notch filter (ANF) and IIR-based ANF as follows:

$$H(z) = \frac{A(z)}{A(\rho z)}, \qquad \text{Equation 1}$$

where H(z) is a Z-transform of the filter transfer function, where A(z) defines the frequency (or frequencies) to be attenuated or target notch frequency (or frequencies) (e.g., frequency response versus magnitude) of the adaptive notch filter, where A($\rho$z) also defines the frequency or frequencies (e.g., frequency response versus magnitude) to be attenuated (e.g., notched) and that are scaled by filter parameter $\rho$ (e.g., contributory filter shape factor or bandwidth control factor).

For example, the filter parameter, $\rho$, applies to a IIR filter if $\rho \neq 0$. Although a Z-transform is used other frequency domain representations could be used; where Fourier transforms are more typically used for modeling FIR filters. In practice, the adaptive notch filter 201 comprises a series of delay lines, adders, summers, data storage registers, shift registers, or accumulators (e.g., realized in programmable logic arrays, digital circuitry or digital signal processors) that are accessible via taps to apply filter coefficients or filter parameters to digital samples of the received signal to define adjust the frequency versus magnitude response of the adjustable filter to reduce or eliminate narrowband interference.

In one embodiment, the filter parameter ρ and the filter coefficient $β_i$, collectively, define filter shape factors of the frequency versus magnitude response for the adaptive notch filter 201 (e.g., IIR notch filter) that can affect the notch bandwidth and attenuation magnitude of depth of the notch of the adaptive notch filter. If ρ≠0, the denominator A(ρz), in Equation 1, cannot be reduced to 1; therefore, the resultant model is an IIR adaptive notch filter. However, if ρ=0, we obtain A(ρz)=1, i.e. the Equation 1 degenerates into a FIR based ANF; the "zeros" of the numerator A(z) defines the frequency to be attenuated or target notch frequency (or frequencies) of the adaptive notch filter. To better illustrate the concept, Equation 2 represents A(z) using a multiplication format as follows:

$$A(z) = \prod_{i=1}^{I}(1 - \beta_i e^{j\omega_i} z^{-1})$$
$$= 1 + \sum_{i=1}^{I} a_i^* z^{-i},$$

Equation 2 where

A(z) defines the frequency (or frequencies) to be attenuated, such as a target notch frequency or target notch frequencies of the adaptive notch filter;

$\Pi_{i=1}^{I}(1-β_i e^{jω_i}z^{-1})$ is a multiplication representation of a set of NBI components from a first NBI component to an ith NBI component up to a total of I NBI components;

I indicates the total number of the narrow band interference components (e.g., NBIs) that need to be rejected or notched, or the order of the adaptive notch filter or the degree of freedom (D.O.F);

$e^{jω_i}$ is the ith NBI component modeled as a simple continuous wave (CW);

$β_i$ is a filter coefficient of the adaptive notch filter that determines a notch depth to the ith NBI and in range of [0, 1];

$1+\Sigma_{i=1}^{I} a_i^* z^{-i}$ is a sum representation, equivalent to the multiplication representation $\Pi_{i=1}^{I}(1-β_i e^{jω_i}z^{-1})$, where $a_i^*$ is the conjugate complex to $a_i$;

$a_i$ is a filter coefficient of the adaptive notch filter.

For example, with respect to Equation 2, $β_i=0$ means there is no attenuation applied to the ith NBI component; while $β_i=1$ means total or perfect elimination of ith NBI component as $1-β_i e^{jω_i}z^{-1}=0$. The sum representation makes it easy to execute the partial derivative therefore widely used for the system identification. For Equation 2, Newton's identities establish the relationship between the $\{β_i e^{jω_i}\}|_{i=1 \ldots I}$ and $\{a_i\}|_{i=1 \ldots I}$.

Equation 3 applies the adaptive notch filter 201 (e.g., IIR adaptive notch filter) as follows:

$$A(\rho z) = \prod_{i=1}^{I}(1 - \rho\beta_i e^{j\omega_i} z^{-1})$$
$$= 1 + \sum_{i=1}^{I} a_i^* \rho^i z^{-i},$$

Equation 3 where

A(ρz) defines the frequency (or frequencies) to be attenuated, such as a target notch frequency or target notch frequencies (e.g., target magnitude versus frequency response) of the adaptive notch filter;

ρ is a filter parameter, which in combination with filter coefficient $β_i$ can be used to control the bandwidth and depth of the notch to each narrowband interference component (NBI), $\Pi_{i=1}^{I}(1-β_i e^{jω_i}z^{-1})$ is a multiplication representation of a set of NBI component from a first NBI component to an ith NBI component up to a total of I NBI components;

I indicates the total number of the narrow band interference (NBI component) that need to be rejected or notched, or the order of the adaptive notch filter or the degree of freedom (D.O.F);

$e^{jω_i}$ is the ith NBI component modeled as a simple continuous wave (CW);

$β_i$ is a filter coefficient of the adaptive notch filter that determines a notch depth to the ith NBI component and in range of [0, 1];

$z^{-i}$ represents a time delay or delay line (e.g., in the z-transform domain) associated with the ith tap of the adaptive narrow band filter;

$1+\Sigma_{i=1}^{I} a_i^* z^{-i}$ is a sum representation, equivalent to the multiplication representation $\Pi_{i=1}^{I}(1-β_i e^{jω_i}z^{-1})$, where $a_i^*$ is the conjugate complex to $a_i$;

$a_i$ is a filter coefficient of the adaptive notch filter; and $1+\Sigma_{i=1}^{I} a_i^* \rho^i z^{-i}$ is the sum representation of denominator; this term cannot be reduced for the IIR based adaptive notch filter.

The adaptive notch filter 201, such as a FIR based adaptive notch filter (ρ=0), can be realized by sampling the frequency response of the narrow band interference component of the received signal and taking an inverse Fourier transform, or by using a least minimum squares (LMS) method to estimate filter coefficients. Similarly, the FIR based adaptive notch filter may estimate filter coefficients in accordance with a chi-square minimization approach, such as minimum mean square error (MMSE) method, that assumes a Gaussian error distribution. However, this disclosure focuses on a practical design of the IIR based on the adaptive notch filter, where in the above equations: (ρ≠0).

Figure 2B:
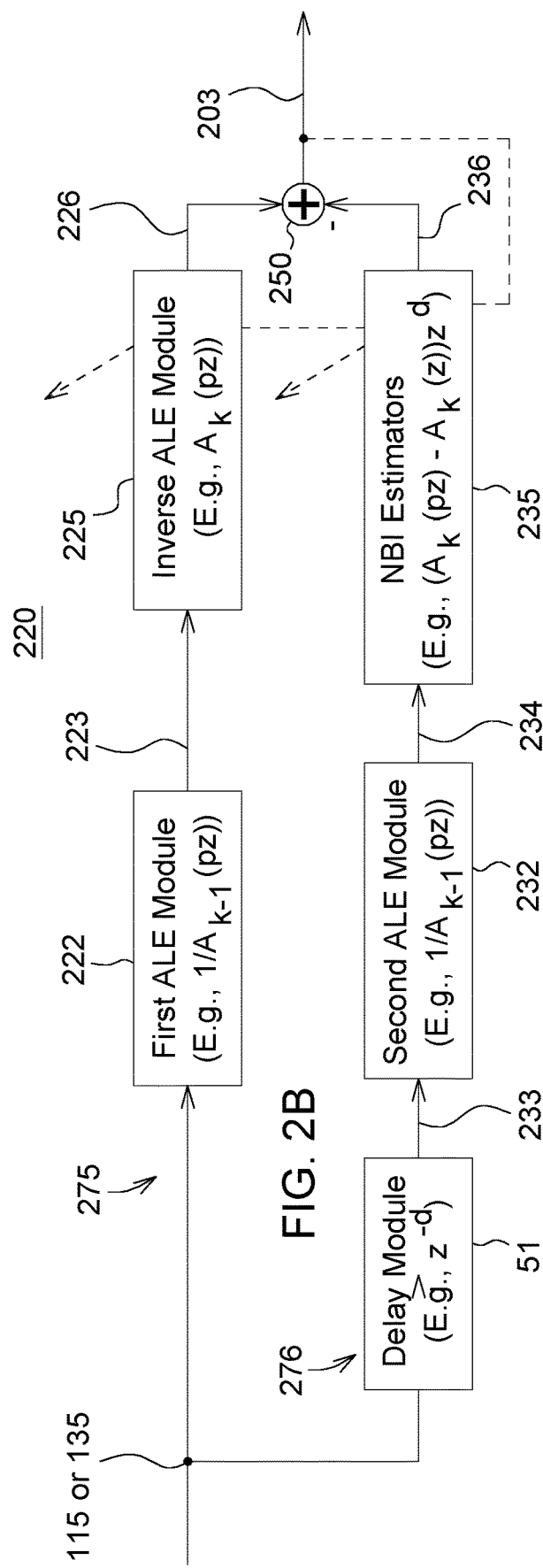
FIG. 2B is a block diagram of an adaptive notch filter using a Steiglitz-McBride technique (e.g., Steiglitz-McBride interference identification model) to select, tune and/or adjust filter coefficients in real time based on a received signal that includes interference or an interfering signal component.

FIG. 2B is a realization of the system of FIG. 2A that applies the Steiglitz-McBride (SM) identification model to provide an error signal to the adaptive control module 202 to update or iteratively converge upon the filter coefficients of the adaptive notch filter 201. As illustrated in FIG. 2B, the SM technique creates two signal processing paths (e.g., in the z-transform domain) for comparison. The first signal processing path 275 (e.g., upper path in FIG. 2B) filters the received signal sampled at epoch k−d (future epoch of the GNSS) using the filter coefficients of the adaptive filter sampled at epoch k−d; the second signal processing path 276 (e.g., lower path) filters the received signal sampled at epoch k−d using the filter coefficients of the adaptive filter sampled at epoch k−1 (e.g., previous epoch of the GNSS); the difference between the samples, accumulators or registers at the output of digital processing signal paths provides the error signal to the adaptive control module 202 as an input to update the filter coefficients.

In FIG. 2B, in the first signal processing path 275 (e.g., the upper signal processing path) the first adaptive line enhancement (ALE) module 222 uses the filter coefficients estimated at epoch k−1 (e.g., previous epoch) and enhances/increases the magnitude of frequency components close to the NBI components. In contrast, in the first signal processing path 275 the inverse adaptive line enhancement (ALE) module 225 applies an inverse ALE computation to estimate the filter coefficients at epoch k (following the previous epoch) or future epoch k−d, which attenuates the frequency components of the NBI components, where the inverse ALE computation may be scaled appropriately (e.g., in magnitude) to both counteract or offset the first ALE module 222 and to attenuate or notch the target NBI component.

In FIG. 2B in the steady-state (SS) mode, where $D_k(z) \sim = D_{k-1}(z)$, the output signal 226 of the first signal processing path 275 is approximately equal to the input signal (e.g., 115, 135) sampled at epoch k. Along the second signal processing path 276 (e.g., the lower signal path), the received signal sampled at epoch k, passes through a delay module 51 to delay the signal by d epochs, where d can be any known or arbitrary number of epochs. The delayed signal 233 is applied to or passes through the second ALE module 232 based on the coefficients estimated at epoch k−1.

In the SS mode, the resultant ALE output 234 of the second ALE module 232 is processed by the narrowband interference (NBI) estimator 235. The NBI estimator 235 estimates one or more NBI components embedded in the received signal (e.g., based on input signals 115, 135, or both) sampled at epoch k.

Therefore, in SS mode the filter output signal 203 of FIG. 2B is approximately equal to the input signal (e.g., 115, 135). Outside of the SS mode, the filter output signal 203 comprises an error signal where the output signal is determined by subtraction at summer 250 of the NBI estimation signal 236 (e.g., NBI digital samples) sampled at epoch k and the output signal 226 of the inverse ALE module 225. Further, outside the SS mode, the filter output signal 203 comprises residual NBI components, the desired PN signal itself, and the noise. The error signal can be defined as the residual NBI component, for example.

In FIG. 2B, the mathematical model of the narrowband interference estimator 235, by applying the Equation 2 and Equation 3 is as follows:

$$[A(\rho z) - A(z)]z^d = \left[1 + \sum_{i=1}^{I} a_i^* z^{-i} - 1 - \sum_{i=1}^{I} a_i^* \rho^i z^{-i}\right] z^d \quad \text{Equation 4}$$

$$= \left[\sum_{i=1}^{I} a_i^* (1 - \rho^i) z^{-i}\right] z^d,$$

where $z^d$ indicates a time advance unit (e.g., in the z-transform domain);

$z^{-i}$ represents a time delay or delay line (e.g., in the z-transform domain) associated with the ith tap of the adaptive narrow band filter;

$\rho$ is a filter parameter (e.g., contributory notch shaping factor), where $\rho^i$ is the filter parameter associated with the ith narrowband interference;

$a_i$ is a filter coefficient of the adaptive notch filter, where $a_i^*$ is the conjugate complex to $a_i$; and I indicates the total number of the narrow band interference (NBIs) that need to be rejected or notched, or the order of the adaptive notch filter or the degree of freedom (D.O.F);

With respect to $z^d$, if the input signal (to the NBI estimator 235) is sampled at epoch k, the output signal (of clock for the NBI estimator 235) is sampled at future epoch k+d. However, any system (e.g., system 220 of FIG. 2B) is not physically realizable if it requires future information, such as information about a future epoch. Because the i in the Equation 4 starts from 1, $[\Sigma_{i=1}^{I} a_i^*(1-\rho^i)z^{-i}]$ introduces a delay of one sample, the digital data processing block of the NBI estimator 235 is physically realizable for only d=1, without further refinements to be discussed later in this disclosure. To achieve the optimal performance, the noise term of the signal (115, 135) sampled at epoch k through the first signal processing path 275 should be independent from the delayed noise term in delayed signal 233 processed by the second signal processing path 276. As illustrated in FIG. 2B, the first signal processing path 275 comprises the first ALE module 222 and the inverse ALE module 225, where the first ALE module 222 is coupled to the inverter ALE module 222 at terminal(s) or node 223. Meanwhile, the second signal processing path 276 comprises the delay module 51, the second adaptive line enhancement (ALE) module 232, and the NBI estimator 235. The over-sampling system commonly requires d>1 to decorrelate the noise terms sampled at different epochs.

The Gauss-Newton adaptive algorithm used to adjust the adjustable, adaptive notch filter 201, or namely, the filter coefficients vector, which will be is described later in this disclosure. The input and output relationship can be defined by the following vector relationship assuming Equation 5:

$$\vec{\theta} = [a_1, a_2, \ldots, a_I]^T \quad \text{Equation 5}$$

After the summation (e.g., subtraction) of the data samples from the first data processing path (branch) and the second data processing path (branch), the (notch) filter output signal 203 can be written as follows:

$$E(k) = R(k) + \sum_{i=1}^{I} a_i^* [R(k-i) - \rho^i E(k-i)] \quad \text{Equation 6}$$

$$= R(k) + \vec{\theta}^H \varphi(k),$$

where

E(k) denotes the filter output signal 203 or output error signal sampled at epoch k, R(k) denotes the input signal or received signal (115, 135) sampled at epoch k, $a_i^*$ denotes the conjugate to the ith element, or the conjugate of $a_i$ which is the ith filter coefficient (e.g., associated with the ith tap of the adaptive notch filter), of estimated vector $\vec{\theta}$, $\vec{\theta}^H$ represents the conjugate transpose of vector $\vec{\theta}$, $\varphi(k) = \{R(k-i) - \rho^i E(k-i)\}|_{i=1 \ldots I}$ is the vector of estimation sampled from epoch k−I to k−1.

One possible goal of the primary adaptive notch filter 200 (e.g., adaptive notch filter system) of FIG. 2A or the primary adaptive notch filter 220 (e.g., adaptive notch filter system) of FIG. 2B is to eliminate a narrowband interference component (e.g., a narrowband interference that has a signal strength or magnitude that exceeds a threshold signal strength) in the input signal (e.g., 115, 135). Therefore, the energy of the filter output signal 203, compared with the energy of signal (e.g., 115, 135), should be significantly reduced because of the attenuation associated with the adaptive notch filter 201. Here, the gradient-descent method is used to find the global minima on the energy surface of E(k), the output signal (or output error signal) that includes an error component, spanned by I-parameter vector $\vec{\theta}$. The negative gradient-descent vector is defined as $$\nabla_R E(k) = \left[\frac{\partial}{\partial a_{1,R}}, \frac{\partial}{\partial a_{2,R}}, \ldots, \frac{\partial}{\partial a_{I,R}}\right]^T E(k) \quad \text{Equation 7}$$

$$\nabla_I E(k) = \left[\frac{\partial}{\partial a_{1,I}}, \frac{\partial}{\partial a_{2,I}}, \ldots, \frac{\partial}{\partial a_{I,I}}\right]^T E(k), \quad \text{Equation 8}$$

where $\nabla_R$ is the partial derivative to the real part of filter coefficient a or the set of filter coefficients $\alpha_i$ which comprise the ith filter coefficient from i equals 1 to I equals I, $\nabla_I$ is the partial derivative to the imaginary part of filter coefficient a or the set of filter coefficients $\alpha_i$ which comprise the ith filter coefficient from i equals 1 to I equals I.

$\psi(k) = -\frac{1}{2}(\nabla_R + j\nabla_I)E(k)$, which by applying Equation 6, becomes Equation 10.      Equation 9

$\psi(k) = \varphi(k)/A(\rho z)$, where      Equation 10

$\varphi(k) = \{R(k-i) - \rho^i E(k-i)\}|_{i=1 \ldots I}$ is the vector of estimation sampled from epoch k–I to k–1; and $A(\rho z)$ defines the frequency (or frequencies) to be attenuated, such as a target notch frequency or target notch frequencies (e.g., target magnitude versus frequency response) of the adaptive notch filter; and $\psi(k)$ is a function (or gradient descent function) of the derivatives of the filter coefficients and the output signal E(k) for any epoch k of the GNSS (e.g., output signal of the block diagram of FIG. 2B that includes an error component in the output signal).

Figure 3:
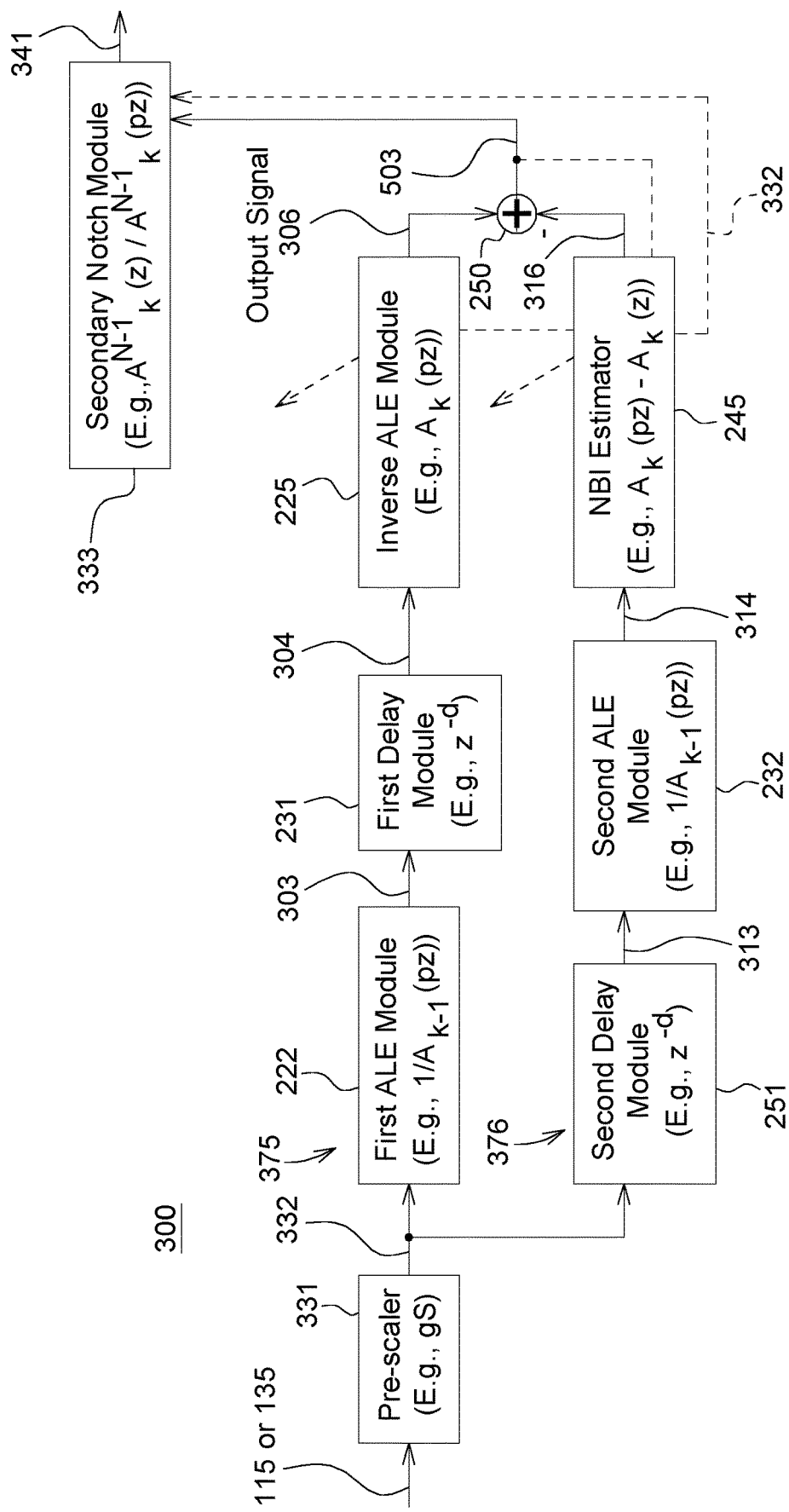
FIG. 3 is a block diagram of a first embodiment of a cascaded notch filter architecture.

Referring to FIG. 3, the above gradient descent function $\psi(k)$ is consistent with an adaptive notch filter (e.g., 300) that has a cascaded IIR structure. The above illustration of the gradient descent derivation will be referenced in later to clarify the cascaded adaptive notch filter structure 300, which can increase the attenuation on the interference signal without deteriorating the stability and adding the complexity of the algorithm.

FIG. 3 is a physically feasible digital data processing model architecture of an adaptive notch filter 300 using the Steiglitz-McBride (SM) method or quasi-Steiglitz-McBride (QSM) method. The adaptive notch filter 300 of FIG. 3 is similar to the adaptive notch filter 220 of FIG. 2B, except the notch filter 300 of FIG. 3 further comprises a pre-scaler 331, first delay module 231 and secondary notch module 333 (e.g., post processing block in FIG. 3). The first delay module 231 and the second delay module 251 are similar to the delay module 51 of FIG. 2B. Like reference numbers in FIG. 2A, FIG. 2B and FIG. 3 indicate like elements, features, processes or modules. Compared with the adaptive notch filter 220 outlined in FIG. 2B, the cascaded, adaptive notch filter 300 of FIG. 3 is well-suited for high speed (e.g., 40 MHz or faster) multi-bit system data processing.

In the block diagram of the adaptive notch filter 300 of FIG. 3, the pre-scaler 331 (e.g., pre-scale block) is used to reduce the dynamic range of the input signal (115, 135) of the received signal or channel, which is used to compensate the gain amplification of the first ALE module 222 and the second ALE module 232. Each ALE module (222, 232) has a gain, $G_{ALE}$, that is described by Equation 11.

$$G_{ALE} = \prod_{i=1}^{I} 1/|1 - \rho \cdot e^{j\Delta\omega_i}| \quad \text{Equation 11}$$

-continued
$$= \prod_{i=1}^{I} 1/\sqrt{1 - 2\rho \cdot \cos(\Delta\omega_i) + \rho^2},$$

where $\rho$ is the bandwidth control factor or contributory notch shape factor introduced in Equation 3.

$\Delta\omega_i = \omega_i - \overline{\omega}$ is the difference between the angular frequency (in radians) of ith interference and the averaged angular frequency (e.g., geometric mean, a moving average, or a weighted average based on the more recent sampling intervals) over I interferences, $\|$ is the absolute value norm of a complex number.

For example, the gain of the first ALE module 222, the second ALE module 232, or both, for the first order notch filter (I=1) is $1/\sqrt{1 - 2\rho \cdot \cos(\Delta\omega_1) + \rho^2} \leq 1/(1-\rho)$. The reduction of the dynamic range of the adaptive filter 300 significantly saves the logic usage in the practical implementation as the processing is widely involved with multi-bits complex number calculation.

In FIG. 3, the time advance unit $z^d$ (previously in the NBI estimator 235 of FIG. 2B on the second signal processing path 275) moves to the first signal processing path (375 of FIG. 3) as first delay module 231. At a reference tap the signal 304 or delayed sample is outputted by the first delay module 231. In FIG. 3, such equivalent time shift between the first signal processing path 375 and the second signal processing path 376 makes the notch adaptive filter 300 of FIG. 3 physically realizable for any delay of d (d>=1). The cascaded adaptive notch filter 300 can be designed to be slightly over-sampled to guarantee the satisfaction of Nyquist criteria. Accordingly, compliance with the Nyquist criteria or reduction of quantization noise tends to require d>1 to decorrelate the noise term in the input signal (115, 135) sampled at epoch k and the delayed input signal 313 sampled at epoch k–d. Because the first delay module 231 of the first signal processing path 375 of FIG. 3 and the second delay module 251 of the second signal processing path 376 of FIG. 3, the first delay module 231 and the second delay module 251, individually and collectively, support physical realization of any arbitrary delay of d along the second signal processing path 376 against the first signal processing path 375. The first signal processing path 375 may be referred to as the first data processing path and the second signal processing path 376 may be referred to as the second data processing path.

The secondary notch module 333 (e.g., post-processing block) is configured to increase the depth of notch (or magnitude of attenuation) without adding to the degree of freedom (DOF). To illustrate the importance of the notch depth, as a reference the notch depth and 3-dB bandwidth for the first order notch filter is defined later in this document. Although the first order notch filter is a simple structure, it does provide useful insight to understand the notch filter performance versus the tunable parameters in the model.

Figure 4:
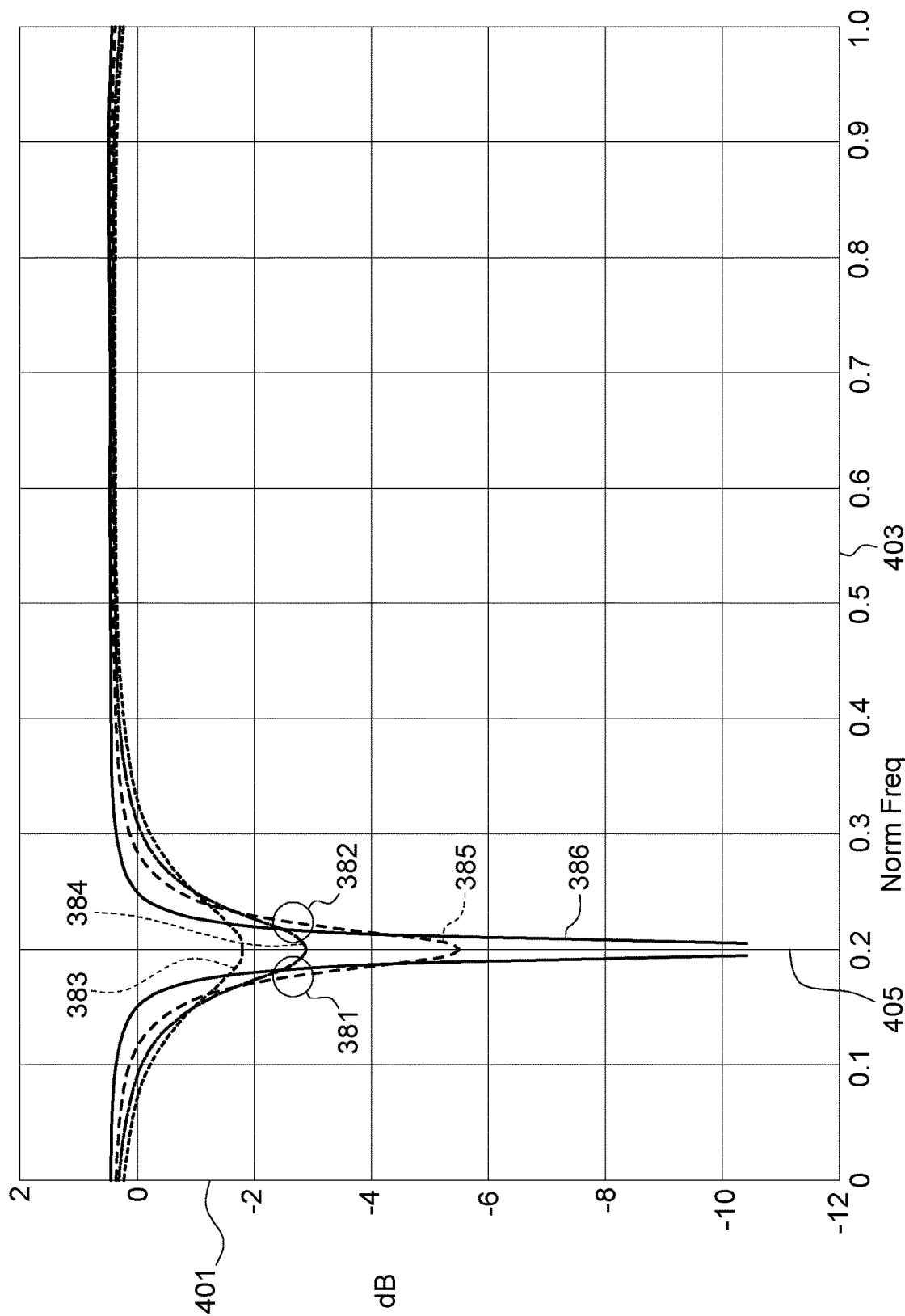
FIG. 4 is a first illustrative example of a magnitude versus frequency response of a notch filter in accordance with the disclosure.

For a first order notch filter, FIG. 4 illustrates the maximum notch attenuation and bandwidth versus the magnitude of absolute value of norm-1 filter coefficient $|a_1|$; various drawings in the disclosure provide the visual illustration of notch filter behavior versus the bandwidth control parameter $\rho$. To improve the notch depth, the disclosure describes a direct implementation of a cascaded notch filter system of FIG. 3 that features a secondary notch module 333.

FIG. 6, FIG. 7, FIG. 8 and FIG. 9 disclose various embodiments of the cascaded adaptive filter or secondary adaptive notch filter (600, 700, 800, and 900) where one or more the embodiments may replace or be preferred to first order notch filters in accordance with their respective characteristics and features disclosed herein that are considered with respect to amelioration of one or more NBI components.

By applying Equation 2 and Equation 3 into Equation 1 and using the first order notch filter (I=1) as an illustration, the notch depth of the filter can be defined by the following Equation 12:

$$D = \frac{1 + |a_i|^2 - 2|a_1|\cos(\Delta\omega_1)}{1 - 2\rho|a_1|\cdot\cos(\Delta\omega_1) + \rho^2|a_1|^2},\quad \text{Equation 12}$$

where
- $\Delta\omega_1$ is the difference of the angle frequency between the receiver estimation and the true transmission;
- $|\alpha_1|$ is the norm-1 magnitude of the filter coefficient $a_1$;
- $|\alpha_1|^2$ is the norm-2 magnitude of the coefficient $a_1$; and
- $\rho$ is the bandwidth control factor or contributory notch shape factor introduced in Equation 3.

In one example, the norm-1 is the vector norm for a vector that is defined by a matrix form with complex filter coefficients (e.g., with real and imaginary components) from an ith to I complex filter coefficient, where I equals 1 for a first order filter. In another example, the norm-1 represents a maximum column sum of a matrix of filter coefficients (e.g., from an ith to I complex filter coefficient), whereas the norm-2 may represent a maximum of an eigen value of dot product of filter coefficient matrix and a transpose of the filter coefficient matrix (e.g., from an ith to I complex filter coefficient).

Based on the above Equation 12, 3 dB bandwidth of the above notch filter can be determined by $$BW_{3dB} = 2\Delta\omega\ st.D(\Delta\omega) = \frac{1}{2} \quad \text{Equation 13}$$
$$= 2\cdot\cos^{-1}\frac{1 + (2-\rho^2)|a_1|^2}{(4-2\rho)|a_1|},$$

where
- $BW_{3\ dB}$ denotes the 3 dB bandwidth of notch filter;
- $\cos^{-1}$ is the inverse function of $\cos(\ )$
- $|\alpha_1|$ is the norm-1 magnitude of the filter coefficient $a_1$;
- $|\alpha_1|^2$ is the norm-2 magnitude of the coefficient $a_1$; and
- $\rho$ is the bandwidth control factor or contributory notch shape factor introduced in Equation 3.

FIG. 4 is a first illustrative example of a magnitude 401 (e.g., relative magnitude) versus frequency 403 response of a primary adaptive notch filter (e.g., 200, 220, 300) in accordance with the disclosure. FIG. 4 shows the magnitude 401 (e.g., in Decibels (dB)) along the vertical axis, whereas the frequency 403 (e.g., normalized frequency) is along the horizontal axis. In particular, FIG. 4 provides a visual illustration regarding the $|a_1|$ impact on the notch depth and bandwidth (e.g., half-power bandwidth or 3 dB bandwidth) of the primary adaptive notch filter (e.g., 200, 220, 300). The interference rejection frequency 405 (e.g., typically aligned with an interference frequency by design) is assumed at 0.2 (of the normalized frequency), the real frequency can be obtained by multiplying with the sampling frequency, $F_s$, in Hertz (Hz). The point 381 denotes the 3 dB degradation or attenuation on the left side of the notch, equal to $\omega_1 - \Delta\omega_1$; and the point 382 denotes the 3 dB degradation or attenuation on the right side of the notch, equal to $\omega_1 + \Delta\omega_1$. Table 1 lists the results shown by FIG. 4, which demonstrates that the notch depth increases with the increase of norm-1 magnitude of the filter coefficient $a_1|a1|$ of the primary adaptive notch filter (e.g., 200, 220, 300).

TABLE 1

Notch Depth and 3 dB Bandwidth vs. $|a_1|$

| $|a_1|$ | Curve Ref. No. | Line Style | Max Attenuation or Notch Depth | 3 dB BW |
|---|---|---|---|---|
| 0.7 | 383 | Short dashes | −1.9 | 0 |
| 0.8 | 384 | Alternating short and long dashes | −3 | 0.025 |
| 0.9 | 385 | Long dashes | −5.6 | 0.045 |
| 1 | 386 | Solid | >−10 | 0.035 |

In FIG. 4, a first notch response 383 of the magnitude 401 of signal strength (e.g., attenuation) versus normalized frequency 403 is indicated by short dashes that define a first curve; a second notch response 384 is indicated by alternating long and short dashes that define a second curve; a third notch response 385 is indicated by long dashes that define a third curve; a fourth notch response 386 is indicated as solid line that defines a fourth curve with the greatest attenuation at the rejection frequency 405.

Figure 5:
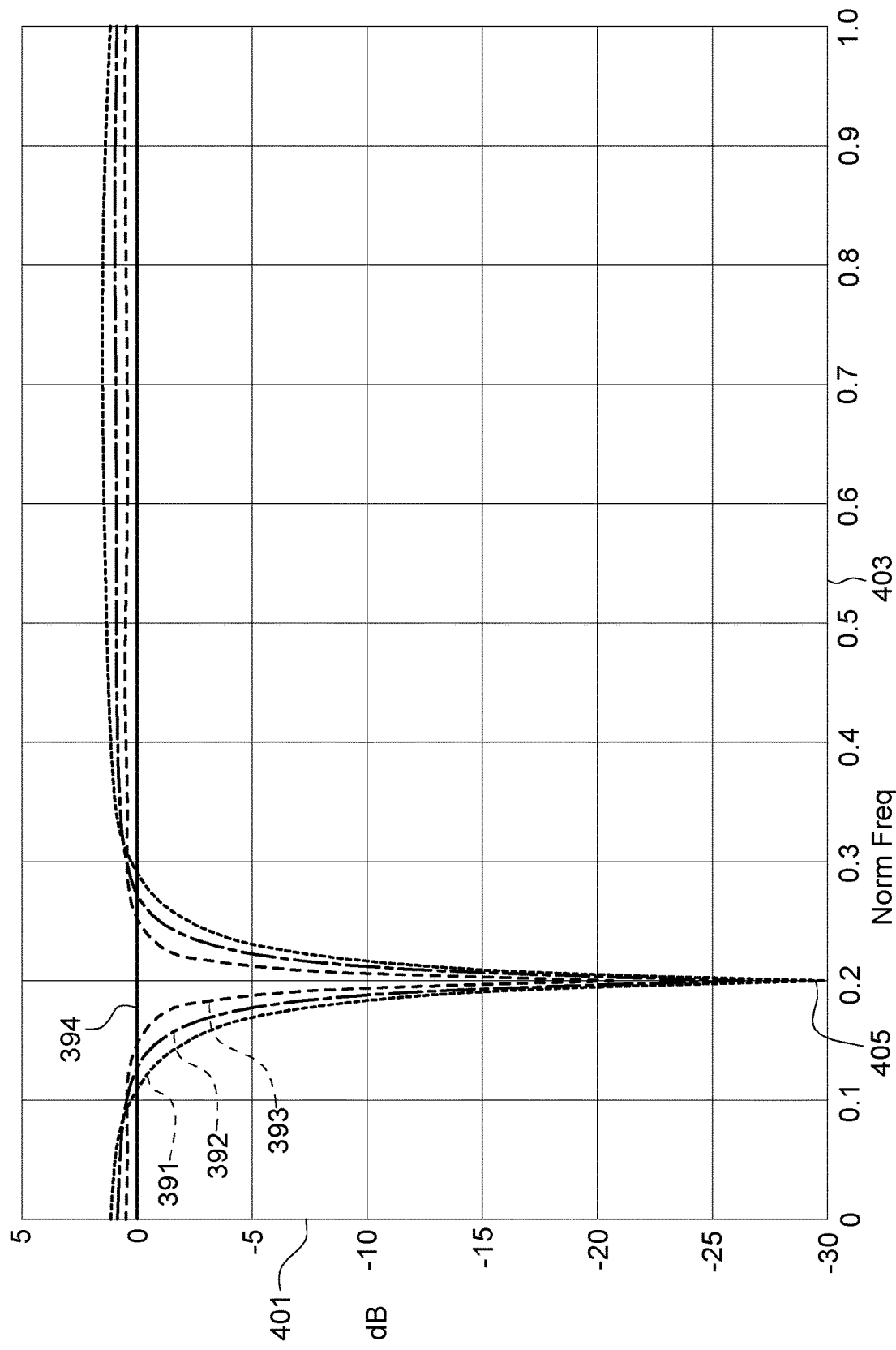
FIG. 5 is a second illustrative example of a magnitude versus frequency response of a notch filter that is associated with various corresponding control parameters (e.g., $\rho$).

FIG. 5 is a second illustrative example of a magnitude 401 versus frequency 403 response of a notch filter that is associated with various corresponding control parameters p. Like reference numbers in FIG. 4 and FIG. 5 indicate like features or elements, for example.

FIG. 5 provides a visual illustration of notch filter bandwidth (e.g., of primary adaptive notch filter 200, 220, 300) and maximum attenuation (e.g., notch depth) versus the bandwidth control parameter $\rho$. Table 2 lists the corresponding results shown by FIG. 5. With the p approaches 1, the notch bandwidth of the primary adaptive notch filter (e.g., 200, 220, 300) becomes narrower and the maximum notch attenuation is reduced. When the $\rho=1$, from the Equation 1, the denominator $A(\rho z)$ reduces to $A(z)$, making the whole notch filter system reduces to $H(z)=1$, an all-pass filter. Therefore, to design a meaningful notch filter, the bandwidth control parameter $\rho$ can never be 1. Also, the design needs to balance the target bandwidth against the precision bits (or size of the fixed-point computation or floating number) in the electronic data processor (e.g., 160, 170) or set of electronic data processors. The closer that $\rho$ approaches to 1, the more bit is required to differentiate $A(\rho z)$ from the $A(z)$. Here, Table 2 suggests a sufficient bandwidth control parameter may range from approximately 0.7 to approximately 0.9, although other values of the bandwidth control parameter $\rho$ may fall within the scope of the claims.

TABLE 2

Notch Depth and 3 dB Bandwidth vs. $\rho$

| $\rho$ | Curve Ref. No. | Line Style | Max Attenuation or Notch Depth | 3 dB BW |
|---|---|---|---|---|
| 0.7 | 391 | Short dash | −30 | 0.115 |
| 0.8 | 392 | Alternating short and long dash | −28 | 0.075 |
| 0.9 | 393 | Long dash | −22 | 0.035 |
| 1 | 394 | Solid | 0 | 0 |

In FIG. 5, a first notch response 391 of the magnitude 401 of signal strength (e.g., attenuation) versus normalized frequency 403 is indicated by short dashes that define a first curve; a second notch response 392 is indicated by alternating long and short dashes that define a second curve; a third notch response 393 is indicated by long dashes that define a third curve; a fourth notch response 394 is indicated as a solid line, flat response, or unattenuated reference magnitude that has a generally constant magnitude 401 of signal strength versus frequency 403; hence, does not attenuate the input signal at the frequency of a narrowband interference signal or rejection frequency 401.

Equation 12 defines the attenuation can be obtained at $\Delta\omega_1$ offset from the true interference frequency. The basic primary adaptive notch filter (e.g., 200, 220) as Equation 1 can be cascaded (e.g., as notch filter 300) to create a multiple stage adaptive notch filter consistent with Equation 14 as follows:

$$H_N(e^{j\omega_1}) = H^N(e^{j\omega_1}), \text{ where} \quad \text{Equation 14}$$

N is the number of stages; and $e^{j\omega_i}$ is the ith NBI modeled as a simple continuous wave (CW), where for the first order filter model i and I equals 1.

Compared with single stage notch filter H(z), the N-stage cascaded system can improve the attenuation or maximum notch depth, in terms of decibels dB, by up to a factor of N, which is the number of stages of the cascaded notch filter.

Figure 6:
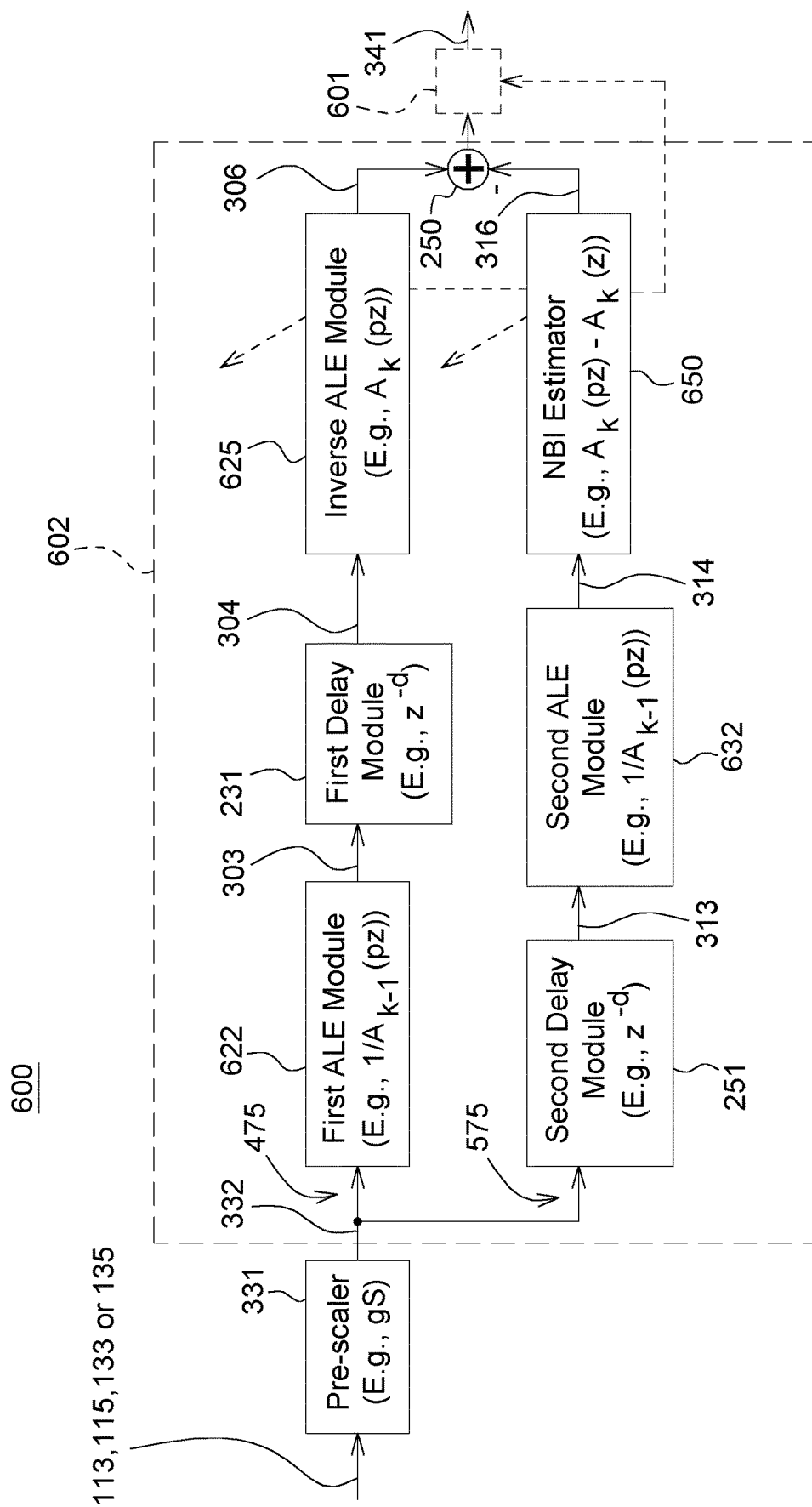
FIG. 6 is a block diagram of a second embodiment of a cascaded notch filter architecture.

FIG. 6 is a block diagram of a second embodiment of a cascaded notch filter 600 and its architecture. In particular, FIG. 6 illustrates a direct implementation of $H_N(z)$ of Equation 12, where the filter modules/blocks of the notch filter 600 of FIG. 6 resemble the filter modules/blocks of the notch filter 300 of FIG. 3. Like reference numbers in FIG. 3 and FIG. 6 indicate like elements, features or processes.

In FIG. 6, the pre-scaler 331 is coupled to the filter data processing system 602 to adjust the gain inputted to the adaptive notch filter 600 (e.g., filter data processing system), such as one or more adaptive line enhancers (e.g., 622, 632). In FIG. 6 within the filter data processing system 602, the first signal path 475 comprises the first ALE (e.g., adaptive line enhancer) module 622 that is coupled to the first delay module 231. In turn, the first delay module 231 is coupled to an inverse ALE module 625. The second signal path 575 comprises the second delay module 251 that is coupled to the second ALE module 632. In turn, the second ALE module 632 is coupled to the narrowband estimator 650.

A summer 250 sums the output signal/samples 306 (in FIG. 6) of the inverse ALE module 625 with the output signal/samples 316 of the narrowband interference estimator to yield an error signal that feeds the optional cascaded, secondary notch module 601. The optional nature of the cascaded secondary notch module 601 is indicated by the dashed lines in FIG. 6.

Separately or cumulatively with the optional cascaded secondary notch module 601, the notch filter 600 of FIG. 6 may comprise an N cascaded system of modules within the first signal path 475 and the second signal path 476. The cascaded system of modules in the notch filter 600 can be modeled, at least partially, based on the modules within the first signal path 375 and the second signal processing path 376, respectively, of notch filter 300 of FIG. 3. To illustrate the potential data storage requirements and computational resources required to implement embodiment of FIG. 6, N=2 can be used in conjunction with some of the previous equations:

$$H_2(z) = \frac{A^2(z)}{A^2(\rho z)} \quad \text{Equation 15}$$

Applying Equation 2 and Equation 3 into Equation 13, the numerator of Equation 13 is set forth in Equation 16.

$$A^2(z) = 1 + \Sigma_{l \neq m} a_l * a_m * z^{-(l+m)} + \Sigma_i (a_i^2) * z^{-2i} \quad \text{Equation 16}$$

Correspondingly, the resulting error signal (versus Equation 6) becomes $$E_2(k) = R(k) + \Sigma_{l m \neq} a_l * a_m * \{R(k-l-m) - \rho^2 E(k-l-m)\} + \Sigma_i (a_i^2) * \{R(k-2i) - \rho^2 E(k-2i)\} \quad \text{Equation 17}$$

Similar to Equation 5, the new parameter vector to Equation 15 can be written in Equation 18 as follows:

$$\vec{\theta}_2 = [(a_1^2, a_1 a_2, \ldots, a_1 a_I), \ldots, (a_I a_1, a_I a_2, \ldots, a_I^2)]^T \quad \text{Equation 18}$$

Compared with $\vec{\theta}$ of Equation 5, $\vec{\theta}_2$, although there are still I independent parameters the requisite potential data storage and data computational resources appear to have increased because of one or more of the following reasons: the size is I times larger than the basic notch filter system H(z);

1. each element in the vector is a multiplication of two independent elements, i.e. the $E_2(k)$ is nonlinearly dependent on the set $\{a_i\}|_{i=1 \ldots I}$;
2. the delayed electronic memory needs to store $\{R(k-i)\}|_{i=1 \ldots 2I}$ and $\{E(k-i)\}|_{i=1 \ldots 2I}$ where i from 1 to 2I, which doubles the electronic memory usage compared with the basic notch filter system H(z);
3. From the derivation of the gradient descent on vector $\vec{\theta}$ described by Equation 7 and Equation 8, the fact 1) increases the complexity of the derivative of $\vec{\theta}_2$ by I times; the fact 1) also degrades the reliability of the linear feedback system; the fact 2) implies that elements of $I^2$-length vector $\vec{\theta}_2$ are dependent and are derived from the base set $\{a_i\}|_{i=1 \ldots I}$; the fact 2) shows the nonlinearity between the base parameter set $\{a_i\}|_{i=1 \ldots I}$ and the output error term, making each derivative much more complicated than a linear term.

Accordingly, for the notch filter 600 of FIG. 6, the N=2 example supports the conclusion that the complexity of the direct method is proportional to $I^N$, where I is the order of the basic notch filter system and N is the number of cascaded stages.

FIG. 7 a block diagram of a third embodiment of a cascaded notch filter or secondary notch filter 700 that illustrates the feedback of the infinite impulse response configuration consistent with the Steiglitz-McBride (SM) approach or QSM approach. Like reference numbers in FIG. 2A, FIG. 2B, FIG. 3 and FIG. 6 indicate like elements, features and processes.

In FIG. 7, the secondary notch module 333 (e.g., secondary notch filter module or cascaded notch filter block), of the secondary adaptive notch filter 700, consistent with the SM technique or QSM technique, is introduced to obtain the deeper attenuation in the magnitude of the notch depth. Further, the cascaded notch filter of FIG. 7 with the SM technique or QSM facilitates one or more of the following items (e.g., for data storage efficiency and/or computational resource efficiency of the one or more data processors):

1) Eliminating the dependency between the elements in the estimated parameter,

2) Reducing the dimension of $\vec{\theta}_N$ by $I^{N-1}$ times,

3) Reducing the electronic memory size by (N−1)×I times,

4) And obtaining the greater or deeper attenuation using the cascaded system.

In the notch filter 300 of FIG. 3, the set of parameter $\vec{\theta}$ with DOF of I at epoch k−1 are used to determine the first ALE module 222 and the second ALE module 232, the updated set of parameter $\vec{\theta}$ with DOF of I at epoch k are used to determine the inverse ALE module, the NBI estimator 245 and the secondary notch module 333.

The secondary adaptive notch filter 700 of FIG. 7 is a detailed illustration of the realization of an Ith order basic notch filter with N-cascaded stages, which can be derived from the basic notch filter 300 of FIG. 3. In FIG. 7, the filter coefficients vector (e.g., Theta$_{k-1}$) 456 sampled at epoch k−1 determines the first ALE (by the first ALE module 302) and the second ALE (by the second ALE module 312). The first data processing path 465 delays the ALE output 303 (of the first ALE module 302) by d, thus creating the output g(k−d) sampled at epoch k−d based on the filter coefficients at k−d−1. The second data processing path 467 generates the ALE output 314 (of the second ALE module 312) based on the delayed received signal sampled at k−d. Therefore, the output from second ALE module 312 h(k−d) is also sampled at epoch k−d based on the filter coefficients at k−1. The second ALE module 312 appears in FIG. 7, FIG. 8 and FIG. 9.

In FIG. 7, FIG. 8 and FIG. 9, the secondary adaptive notch filter (700, 800, 900) embodies an inverse ALE module (e.g., 225) as a first delay line assembly 410 and embodies a NBI estimator (e.g., 235 or 245) as a second delay line assembly 440. Each delay line assembly consists of I delay line units, corresponding to the order of notch filter of I, from i equals 1 to I. In one configuration, each delay line unit represents a delay of one sample. In the first delay line assembly 410, the first delay line 361 outputs or stores the first delayed ALE output of first tap 404; the second delay line 361 outputs or stores the second delayed ALE output of a second tap 406; the third delay line 361 (or Ith delay line) outputs or stores the third delayed ALE output of a third tap 409. For example, the first delayed ALE output of a second tap 406 may be notated as a delay of g(k−d−1); the second delayed ALE output of a second tap 406 may be notated as a delay of g(k−d−2); and the third delayed ALE output of a third tap 409 may be notated as a delay g(k−d−3); the Ith delayed ALE output may be notated as a delay of g(k−d−I). In the second delay line assembly 440, the first delay line 363 outputs or stores the first delayed ALE output 435; the second delay line 363 outputs or stores the second delayed ALE output of a second tap 436; the third delay line 363 (or Ith delay line) outputs or stores the third delayed ALE output of a third tap 439. For example, the first delayed ALE output 435 may be notated as a delay of h(k−d−1); the second delayed ALE output of a second tap 436 may be notated as a delay of h(k−d−2); and the third delayed ALE output of a third tap 439 may be notated as a delay h(k−d−3); the Ith delayed ALE output may be notated as a delay of h(k−d−I).

As used in this document, the reference to any filter coefficient vector indicates any of the following: (a) the input signal and the output signal (of the filter or adaptive filter) that is (or are) filtered may be expressed as one or more vectors (e.g., with real and imaginary signal components, or with phase and magnitude signal components); (b) the input signal and the output signal (of the filter or adaptive filter) may be expressed as one or more data samples that can be arranged in a matrix or multidimensional array; (c) filter coefficients may apply to a digital filter (e.g., of any filter order) such as an infinite impulse response (IIR) filter, a finite impulse response filter (FIR) or a combination, cascade or hybrid of IIR or FIR, or any adaptive filter set forth in this document; and (d) filter coefficients (e.g., scalar values typically referred to as a, b, or $a_1, a_2 \ldots a_N$ and $b_1, b_2 \ldots b_N$, where N is any positive integer greater than 2 that depends on filter order) related to a transfer function or input/output function, which can be expressed mathematically in the Z-transform domain, as a Laplace transform (e.g., S-transform), or in another frequency domain representation.

In FIG. 7, FIG. 8, and FIG. 9 in the first data processing path (e.g., branch)(365, 465, 565, respectively), each delayed signal is scaled by the first set of filter factors (filter coefficient vector 456 in FIG. 7; first filter coefficient estimate 505, second filter coefficient estimate 506 in FIG. 8; filter coefficient vector 656 in FIG. 9) which are geometrically proportional to the delay. For example, after the first delay line 361 (e.g., $z^{-1}$) at the corresponding first tap 404, the first delayed data sample 415 (e.g., first designated signal) is equal to the input signal 304 (or delayed digital samples at the corresponding reference tap 414) scaled by $a_1 * \rho^1$, where the input signal 304 is inputted to the respective inverse ALE module (225, 625) or delay line assembly 410. After the second delay line 361 (e.g., $z^{-1}$) at the corresponding second tap 406, the second delayed data sample 416 (e.g., designated signal) is equal to the input signal, of a first tap 404, (or delayed digital samples) scaled by $a_1 * \rho^2$, and so on until the Ith delay line and associated Ith tap is scaled by) scaled by $a_1 * \rho^I$.

Meanwhile, in the second data processing path (e.g., branch)(367,467,567), each delayed signal line is scaled by the second set of filter factors (filter coefficients vector 456 in FIG. 7; first filter coefficient estimate 505, second filter coefficient estimate 506 in FIG. 8; 656 in FIG. 9) which are geometrically proportional to the delay. For example, after the first delay line 363 (e.g., (z−1)) at the first tap 435, the designated signal 445 (or delayed digital samples) is equal to the input signal 314 (or delayed digital samples (e.g., from a second ALE module output)) scaled by $a_1 * (1-\rho^1)$; after the second delay line 363 (e.g., (z−1)) at the second tap 436, the second delayed data sample 416 (e.g., designated signal) is equal to input signal, at a first tap 435, scaled by $a_2 * (1-\rho^2)$. After the third delay line 363 (e.g., ($z^{-1}$)) at the corresponding third tap 439, the signal 449 (or second delayed data sample) is scaled specifically by $a_3 * (1-\rho^3)$, or generally by $a_I * (1-\rho^I)$, and so on until the Ith delay line and associated Ith tap.

The signals (or data samples) from the first delay line assembly 410 (in the respective first data processing path 365, 465, 565) are paired with the signals (or data samples) from the second delay line assembly 440 (in the respective second data processing path 367, 467, 567), where there are a primary pair of first delayed data samples (415, 445) and a second pair of second delayed data samples (416, 446). Each pair of signals or data samples is summed by a respective summer 250 to generate a corresponding combined signal (424, 425, 426, 429, 439), which can be inputted to adder 502 via virtual, logical or physical communication paths, such as communication paths. For example, the first delay line 361 (e.g., first delay unit) and the first delay line 363 (e.g., another delay unit) provide (e.g., simultaneously) a primary pair of first delayed data samples (415, 445) to create the signal 425 (e.g., first summer output) by summer 250. Similarly, the second delay line 361 (e.g., second delay unit) and the second delay line 363 (e.g., another delay unit) provide (e.g., simultaneously) the secondary pair of second delayed data samples (416, 446) creates the signal 426 (e.g., second summer output) by summer 250. Further, an Nth delay line 361 (e.g., third delay unit) and the Nth delay line 363 (e.g., another delay unit)

provide (e.g., simultaneously) an Nth pair of data samples (419, 439), such as third delayed data samples (419, 439) to create the signal 429 (e.g., third summer output) by summer 250. In one embodiment, the adder 502 sums the I combined signals from I delay units (361, 363) to result in the filter output signal 603 with an error signal component. In one embodiment, within the adder 502 the aggregate data samples from the summers 250 are accumulated in a buffer memory or registers for adding.

The configurations of the secondary adaptive notch filters (700, 800, 900) of FIG. 7, FIG. 8 and FIG. 9, respectively, each use feedback to facilitate determination of the filter coefficients or filter coefficients and filter parameters. The illustrated examples of FIGS. 7, 8 and 9 use IIR filter configurations with feedback. With respect to such feedback in FIG. 7 and FIG. 9, the combined signals or summed signals from the I delayed units, such as signals 425, 426, . . . , and 429, define a vector signal 453 ($Ph_{Ik}$) which is used to update both covariance matrix (e.g., by the covariance update module 457) and coefficients vector (e.g., by the coefficients update module 458) for the secondary adaptive notch filter (700, 900).

In FIG. 7, the covariance update module 457 takes the vector signal 453 and the covariance matrix P sampled at epoch k−1 to generate the covariance matrix 455 (e.g., update module output data) sampled at epoch k (e.g., $P_k$). Cumulatively, the coefficients update module 458 takes the filter coefficients vector 456 sampled at epoch k−1 (e.g., $P_K$−1), the updated covariance matrix 455 sampled at epoch k, and the filter output signal 603 (e.g., error signal) sampled at epoch k to generate the updated filter coefficients vector 459 (e.g., $Theta_k$) sampled at epoch k. In FIG. 7, the vector signal 459 (e.g., $Theta_k$ or $Theta_{k+1}$) can be applied to the first data processing path 365 and the second data processing path 367 as feedback by first ALE module (e.g., 302) and second ALE module (e.g., 312) for the epoch k+1, or as part of a cascaded feedback system of the secondary adaptive notch filter 700. Similarly, in FIG. 9, the vector signal (e.g., $Theta_k$ (659) or $Theta_{k-q}$ (656)) can be applied to the first data processing path 565 and the second data processing path 567 as feedback to first ALE module 302 and second ALE module 312 for the epoch k+1, or as part of a cascaded feedback system for the secondary adaptive notch filter 900.

The secondary adaptive notch filter 700 of FIG. 7 comprises a feedback system or subsystem is involved with the I×I covariance matrix and I×I vector calculation. For example, in FIG. 7, both modules 457 and 458 require or can use an I×I matrix multiplication, I×I vector multiplication, and normalization division. Similarly, in FIG. 9, both the covariance update module 657 and the coefficients update module 658 require or can use an I×I matrix multiplication, I×I vector multiplication, and normalization division. In the practical application specific integrated circuit (ASIC) implementation, the multi-bit matrix multiplication is a challenge for the high-speed system. In addition, the division can be as difficult as any division algorithm, such as Gauss-Newton gradient descent or radix-2 approach. Accordingly, the algorithm may require multiple steps to converge, for example to a system using radix-2 divisional algorithm, to satisfy the feedback system or feedback subsystem to operate at a sampling frequency Fs (e.g., within a range from approximately 40 MHz to approximately 300 MHz). Further, in FIG. 7 the covariance update module 457 and the coefficients update module 458 generally needs to operate at M×Fs, where M is the bit width of the dividend.

This challenge can tend to make the feedback system or subsystem infeasible to fit for some high-speed processing systems.

To tackle the aforementioned challenges and to make the adaptive notch filter and its association feedback system suitable for the high-speed multi-bit application, this disclosure can simplify the algorithm by applying some reasonable limitations as set forth in the simplified (e.g., reduced complexity adaptive notch filter system 800 of FIG. 8. In order to eliminate the matrix and vector multiplication, as shown in FIG. 8, the simplified, cascaded adaptive notch filter 800 reduces the delay units of the first signal processing path 565 and of the second signal processing path 567 to only two delay lines (361, 363) (i.e. I=2) for each signal processing path (565, 567) and such cascaded adaptive notch filter is able to attenuate up to two NBI components. Because this model of FIG. 8 reduces to the second order notch filter, the filter coefficients vector consists of two elements, such as parameter vector (e.g., 425, 426), or first filter coefficient estimate 505 (e.g., filter parameter elements), second filter coefficient estimate 506 (e.g., filter parameter elements), 506 and 546.

With respect to FIG. 8, the feedback module will be emphasized because the rest of the modules are the same as those in notch filter of FIG. 7, where like elements in any two figures in this document indicate like elements, features or processes. In FIG. 8, for the feedback system, the bit width of the combined signals (435, 426) can be relatively wide because of the multiplication calculation along the first signal processing path 465 and the second delay signal processing path 467. In FIG. 8, the first regulator 515 and second regulator 516 can be modeled as sign function (or alternately a sine function or cosine function), which can ignore, round, approximate, or estimate the magnitude information and round or approximate the phase information to the center of each quadrant among the four states. The resultant signals, first regulated output 525 and second regulated output 526, only have four possible states of complex values: {1+i, 1−i, −1+i, −1−i}, such as quadrature type modulation states. The first regulator and second regulator (515, 516) significantly reduce the complexity of calculation in the first update module 535 and second update module 536. As also, the signals 525 and 526 are determined or processed separately by first regulator 515 and second regulator 516, implying the correlation, where elements of the covariance matrix are not located on the diagonal position, between the two coefficients can be neglected as well to simplify matrix calculations by the data processor (160, 170) or the Application Specific Integrated Circuit (ASIC) or other another electronic data processor.

In FIG. 8, to tackle the challenge of multi-bit division in the high-speed processing mode, the first norm approximation module 512 introduces a magnitude approximation. The magnitude of the complex signal 332 (e.g., digital data samples inputted to the first NB rejection system 110 and the second NB rejection system 130) is round up to the closest exponent of 2 which is modelled by:

$$A_{approx} = 2^{\lceil log_2 A \rceil}, \text{ where} \qquad \text{Equation 19}$$

A is the magnitude of complex signal 332,

⌈ ⌉ is the ceiling function, $A_{approx}$ is the resultant approximation to the magnitude. To the extent that $Log_2$ in the Equation 19 is still not feasible for any specific data processor (160, 170) or ASIC implementation, it be restated as equivalent or approximated to the following Equation 20:

$$A_{approx} = 2^{\underset{i}{argmax\{b_i=1\}}+1}, \text{ where}$$

Equation 20

$$\underset{i}{argmax}\{b_i = 1\}$$

returns the index of the index of MSB whose $b_i=1$, for example, if A=001100b, the return value is 3.

In one embodiment, at the output of the first norm approximation module 512, the approximated magnitude or approximated normalization term 513 successfully replaces the division with a simple right shift. Since the approximated magnitude is greater than the signal magnitude, the filter is updated with less gain. Without considering the precision issue in the fixed-point design, the lower gain only implies a slower convergence. As the processing is running at tens to hundreds MHz rate, the convergence time difference can be reasonably neglected.

In FIG. 8, the first update module 535 takes the first filter coefficient estimate 505 sampled at epoch k−1, the approximated normalization term 513 from the first norm approximation module 512, the first regulated output 525, and the filter output signal 603 (e.g., error signal output by adder 502) to generate the first coefficient estimate 545 sampled at epoch k. Similarly, the second update module 536 takes the second filter coefficient estimate 506 sampled at epoch k−1, the approximated normalization term/output 526 (from the second regulator 516), and the filter output signal 603 (e.g., error signal) to generate the second coefficient estimate 546 sampled at epoch k. In one configuration, the algorithm used by the first update module 535 and the second update module 536 is modeled as follows or conform to the following equations:

$$a_{i,k}=a_{i,k-1}+\{reg_{i,k} \cdot E_k >> b_{approx}\}, \text{ where}$$

Equation 21

$a_{i,k-1}$ is the ith coefficient sampled at epoch k−1 (i=1, 2),
$reg_{i,k}$ is the ith regulator output sampled at epoch k (i=1, 2),
$E_k$ is the error signal sampled at epoch k, and
$b_{approx}$ is the shifted bits representation of approximated magnitude, equal to $\log_2 A_{approx}$.

As shown by Equation 21, the approximated normalization term (right shift $b_{approx}$) is an overestimation of the true magnitude of the error signal $E_k$, i.e., the resultant $E_k >> b_{approx}$ is relatively smaller compared with the exact reference. In terms of the fixed-point solution, this does not only imply the long convergence time, but a potential risk of loss in precision. To relieve this potential risk, the data processor (160, 170) can increase the precision scale to the filter coefficients and the corresponding path to $E_k$ calculation. To determine the minimum precision scale while satisfying the convergence and accuracy requirement, the electronic data processor (160, 170) runs or executes a MonteCarlo (MC) simulation to generate the statistical matrix under different scale configurations. In this embodiment that uses the statistical matrix derived from or generated from the MonteCarlo simulation, the statistics from the simulation shows that a greater number bit scale (e.g., fourteen bits scale) is required if adopting the approximated normalization approach, compared with a lower number bit scale (e.g., eight bits scale) using the exact division. Balancing against the complexity and challenge to the high-speed processing by division, the electronic data processor (160, 170) can select the optimal division processing algorithm based on available processing capacity, through-put or estimated lag time.

FIG. 9 is a block diagram of a fifth embodiment of a cascaded notch filter 900 based on a mini-batch gradient descent algorithm. In FIG. 9, the notch filter 900 provides an example of mini batch update for adaptive learning system. The concept is sometimes mentioned in the context of training a neural network, and the concept is very suitable for the high-speed filtering update. Accordingly, the mini-batch update can fully utilize the specialized vector or matrix instruction set provided by a dedicated digital signal processor, or electronic data processor.

Assuming a mini batch size of q, in FIG. 9. the feedback update rate of the notch filter can be reduced by a factor of q. Instead of updating the system parameter based on a filter output signal 603 (e.g., instant error signal), the update is executed based on an average over the past q signals. Therefore, the mini-batch update approach not only slows the computational rate of the electronic data processors (160, 170), but has the potential to fully uses the vector and matrix processing feature of certain electronic data processors (160, 170). The mini-batch update for determination or filter coefficients also improves the noise resistance.

In FIG. 9, the filter coefficient vector 656 remains constant over the past q epochs. For example, the filter coefficient vector 656 (Theta$_{k-q}$) may remain generally constant from k−q+1 to k, corresponding to the mini batch size of q. Instead of using the instantaneous vector signal 453 and the filter output signal 603 (e.g., output error signal with a corresponding error component) to drive the feedback loop, a first electronic memory block 652 is used to store the vector signal 453 sampled in the past q epochs (k−q+1 to k) and resulting a matrix of Equation 22 as follows:

$$\Phi_{v,k}=(\varphi_{k-q+1} \ldots \varphi_k), \text{ where}$$

Equation 22

$\Phi_{v,k}$ denotes a matrix of the vector signal 453 (I×1) sampled over the past q epochs (k−q+1 to k),
$\varphi_{k-q+1}$ denotes the vector signal 453 (I×1) sampled at epoch k−q+1, and
$\varphi_k$ is the vector signal 453 (I×1) sampled at epoch k A second electronic memory block 651 is used to store the filter output signal 603 (e.g., error signal) sampled in the past q epochs (k−q+1 to k), which span a vector as $E_{v,k}=(E_{k-q+1} \ldots E_k)^T$. In the notch filter 900 of FIG. 9, the covariance matrix update module 657, uses a batch of vector signal 453, (e.g., which is accumulated to provide or derive update module input 653) and update module input 654 to update the covariance in Equation 23 as follows:

$$P_k = P_{k-q} - \frac{P_{k-q}\Phi_{v,k}\Phi_{v,k}^H P_{k-q}^H}{\Phi_{v,k}^H P_{k-q}\Phi_{v,k}},$$

Equation 23 where
$P_k$ is the covariance matrix sampled at epoch k,
$P_{k-q}$ is the covariance matrix sampled at epoch k−q,
$\Phi_{v,k}$ is the set of vector signals sampled from epoch k−q+1 to k,
$( )^H$ denotes the conjugate transpose.

The mini-batch update that is supported by the covariance matrix update module 657 in the notch filter 900 of FIG. 9 is different that the update module input 454 of FIG. 7, for instance. In the notch filter of FIG. 9, the coefficients update module 658 uses the mini-batch updated covariance matrix 655 (from covariance update module 657) and a batch of error signals sampled from epoch k−q+1 to k to update or determine the filter coefficients vector in Equation 24 as follows:

$$\overline{\theta_k} = \overline{\theta_{k-q}} - \frac{P_k \Phi_{v,k} E_{v,k}^*}{q}, \qquad \text{Equation 24}$$

where
- $\overline{\theta_k}$ is the coefficients estimation sampled at epoch k,
- $\overline{\theta_{k-q}}$ is the coefficients estimation sampled at epoch k−q,
- $P_k$ is the covariance matrix sampled at epoch k,
- $\Phi_{v,k}$ is the set of vector signals 453 sampled from epoch k−q+1 to k,
- $E_{v,k}^*$ is the set of filter output signal (203, 503, 603) or error signals sampled from epoch k−q+1 to k, and
- q is the size of the mini batch.

The mini-batch update (e.g., of filter vector coefficients 659 or filter coefficients) that is supported by the filter coefficients update module 658 in the notch filter of FIG. 9 is different that the update module input 454 of FIG. 7, for instance. The resultant filter coefficients parameter (e.g., 659) will stay unchanged for the next q epochs, say for example from k+1 to k+q. Such mini-batch update algorithm is also suitable for or compatible with the simplified notch filter of FIG. 8, where the first update module 535 and second update module 536 can be modified to take the batch of feedback signals to execute the mini batch update.

To measure the signal-to-noise (SNR) degradation resulting from the uncompensated NBI residual in signal (203, 503, 603) a theoretical analysis is introduced in this section which provides a very good reference to predict the notch filter performance.

In FIG. 10, the vertical axis indicates signal magnitude 751 and the horizontal axis 752 indicates frequency. The power spectrum density 704 of the desired received signal carrier or carriers. The signal 701 denotes the desired PN sequence, assuming the PN is centered at "0" with power of $P_{PN}$ in milliwatts. The baseband bandwidth 702 indicates the accumulation bandwidth or frequency range of data samples for the digital baseband processing, for example, 1 KHz bandwidth or upper frequency limit. The NBI component 705, with power of $P_J$ milliwatts, is located at frequency 703 which is $\Delta F_J$ Hz away from the PN center, such as at 701. The notch depth or peak attenuation 706 can be expressed as a ratio or in decibels (dB). The residual NBI 707 remains after application of the notch filter (e.g., 300, 700, 800, 900). For example, with reference to FIG. 3, the received signal (115, 135) passes through the notch filter system 300, the resultant signal or error signal 341 is defined in Equation 25 as follows:

$$E = PN + J_r + n, \text{ where} \qquad \text{Equation 25}$$

E denotes the error signal,
PN denotes the pseudorandom sequence with power of $P_{PN}$, and
$J_r$ denotes the residual power of the NBI, and
n is the receiver thermal noise.

The power to the residual NBI or interference error component is as follows in Equation 26:

$$P_{Jr} = \frac{P_J}{D_{NF}} \text{ or } dBm_{Jr} = dBm_J - dB_{NF}, \qquad \text{Equation 26}$$

where
- $P_{Jr}$ is the power in milliwatts to NBI component of error signal 341,
- $P_J$ is power in milliwatt to NBI component of the received signal or input signal (115, 135, or both),
- $D_{NF}$ is the notch filter attenuation on NBI in ratio noted by 706,
- $dBm_{Jr}$ is the power in dBm to NBI component of error signal 341,
- $dBm_J$ is the power in dBm to NBI component of the received signal or input signal (115, 135, or both),
- $dB_{NF}$ is the notch filter attenuation on NBI in dB noted by 706.

The error signal 341 is despreaded by the local PN replica. Assuming the perfect alignment with the PN component in error signal 341, the de-spreading process concentrates the power of PN into frequencies from "0" to 702; it also spreads the line spectrum of residual NBI 707 into a power spectrum density 704 with generally sinc pattern as set forth in Equation 27, and as illustrated in FIG. 10.

$$PSD_{Jr}(f) = P_{Jr} \cdot \text{sinc}^2(f - \Delta F_J), \text{ where} \qquad \text{Equation 27}$$

- $PSD_{Jr}(f)$ denotes the power spectrum density (704) of the NBI despreaded by a PN sequence,
- $P_{Jr}$ is the power of the residual NBI (707) contained in the error signal 341,
- sinc(x) is the sinc function defined as sin($\pi$x)/($\pi$x), and
- $\Delta F_J$ denotes the frequency separation between the NBI located at frequency 703 and the PN sequence located at "0".

The integration of the sinc pattern over whole frequency range is 1 in Equation 28 as follows:

$$1 = \int_{-\infty}^{+\infty} \text{sinc}^2(f - \Delta F_J) df \qquad \text{Equation 28}$$

In the frequency response 750 of FIG. 10, the bandwidth between reference frequency pairs (733, 713; 713, 703; 703, 723; 723, 743) along the frequency axis 752 are all equal to the chipping rate of PN signal. Integrating the power spectrum density 704 from within the baseband bandwidth 702 (e.g., from 0 Hz to a frequency limit at the upper or rightmost vertical edge of the baseband bandwidth 702) estimates the power of residual NBI that leaks into the demodulator output, noted as 708 as follows:

$$J_{r0} = \frac{1}{F} \int_0^F PSD_{Jr}(f) df, \qquad \text{Equation 29}$$

where
- $PSD_R(f)$ is the power spectrum density of 704,
- F is the bandwidth of demodulator output, 702, and
- $J_{r0}$ is the averaged power spectrum density within bandwidth of F.

Based on Equation 29, the SNR degradation can be computed in Equation 30 as follows:

$$L = 1 + \frac{J_{r0}}{N_0}, \qquad \text{Equation 30}$$

where
- $J_{r0}$ is the averaged power spectrum density of NBI within the bandwidth of F,
- $N_0$ is the power spectrum density of the thermal noise, and
- L is the SNR degradation in ratio.

A receiver with an illustrative adaptive notch filter system (e.g., 300, 700, 800, 900) is configured to evaluate possible attenuation performance consistent with a modeled example in FIG. 11 through 15, inclusive.

FIG. 11 is an illustrative example of a chart of magnitude versus frequency response of the adaptive notch filter, where an adaptive solution and an expected or benchmark solution are compared. The signal magnitude 805 is illustrated on the vertical axis and the frequency is illustrated on the horizontal axis 803. The notch filter response has a dual notch response comprises a first notch 802 and a second notch 804 that are separated by a frequency separation 809, where the second notch 804 is aligned with a second notch center frequency 808 that attenuates a NBI component 812. Meanwhile, the first notch 802 has a first notch center frequency 806. The reference magnitude 807 is aligned with a constant or uniform magnitude (or a horizontal line representative) of zero decibels along the axis of the signal magnitude 805

The model parameters of the modeled adaptive notch filter are set forth in Table 3 for simulation setup for the performance evaluation of the illustrative notch filter. For example, the system has an analog-to-digital converter (ADC) of 8 bits and filter coefficients scale of 14 bits for the associated, modeled adaptive notch filter. Its goal is to attenuate two continuous wave (CW) interference signal components (J1/N and J2/N) that are 42 dB above the total noise power or noise floor, where the frequency of the first NBI component ($F_R$) is at 5 MHz and where the frequency of the second NB component ($F_{J2}$) is at 15 MHz. The pseudorandom noise code (PNr) modulation as at a frequency of 1.023 MHz and is signal to noise ratio (C/NO) is 45 decibels with respect to the noise floor.

TABLE 3

Simulation/Modeled Configuration

| PNr (MHz) | C/N0 (PN) | $F_{J1}$ (MHz) | J1/N (dB) | $F_{J2}$ (MHz) | J2/N (dB) | ADC (bits) | Coefficient Scale (bits) |
|---|---|---|---|---|---|---|---|
| 1.023 | 45 | 5 | 42 | 15 | 42 | 8 | 14 |

Table 4 in conjunction with FIG. 11 illustrate the frequency response of the modeled adaptive notch filter versus the ideal frequency response of an ideal notch filter, where the ideal frequency response provides additional attenuation at the notch frequency as best illustrated by the dashed lines in rightmost notch of FIG. 11.

TABLE 4

Frequency Response of the Ideal Notch Filter vs. the Modeled Adaptive Notch Filter at Steady State (FIG. 810)

| Magnitude Response | Ref. No. | D(FJ1) dB | D(FJ2) dB |
|---|---|---|---|
| Ideal Notch Filter | 812 | −42 | −42 |
| Adaptive Notch Filter @ 1 ms convergence | 802, 804 | −43 | −41 |

Further, FIG. 11 demonstrates the frequency response between the ideal notch filter (based on the predefined or a priori knowledge of the respective frequencies of the two NBI components) and the adaptive frequency response of system 500 after a convergence period (e.g., 1 millisecond (ms) running of the filter after initialization). Table 4 lists the notation and notch depth in FIG. 11, which implies the adaptive frequency response of system 500 converges to the ideal in ⅛ of the 1 ms~=125 uS.

TABLE 5

Coefficients of Adaptive Notch Filter vs. the Derived Coefficients of Ideal Notch Filter

| Coefficients | Ref. No. | Adaptive Filter Coefficient (Value) @ 1 ms Convergence | TRUE |
|---|---|---|---|
| A0.Re (Real) | 821 | −0.05 | −0.05 |
| A0.Im (Imaginary) | 822 | 1.44 | 1.438 |
| A1.Re (Real) | 823 | −1 | −0.99 |
| A1.IM (Imaginary) | 824 | −0.06 | −0.07 |

FIG. 12 is an illustrative example of a chart that shows convergence versus time of the filter coefficients to a steady-state solution of filter coefficients as a reference. In FIG. 12 the vertical axis shows the filter coefficients 828 and the horizontal axis 827 shows time.

Table 5 in conjunction with FIG. 12 demonstrate the convergence process of the filter coefficients in a series of filter coefficient curves 820. The vertical axis represents the filter coefficients axis 828, whereas the horizontal axis represents time 827. Here, in the example, the filter coefficients are initialized with "0", and average an illustrative convergence period (e.g., at about 125 uS), the filter coefficients all converge very close to the expected value as shown by Table 5. In FIG. 12, each filter coefficient (AO, A1) has a real component and an imaginary component. For example, the first filter coefficient (A0) has a real filter coefficient (AO.RE) indicated by reference number 821, which is illustrated as a dashed reference line, that reaches convergence at inflection point 829; the first filter coefficient (A0) has an imaginary filter coefficient (AO.Im) indicated by reference number 822, which is illustrated as a alternating dot-dash reference line, that reaches convergence at inflection point 830; the second filter coefficient (AO) has a real filter coefficient (A1.RE) indicated by reference number 823, which is illustrated as a solid line/curve, that has an inflection point at 831; the second filter coefficient (A1) has an imaginary filter coefficient (A1.IM) indicated by reference number 824, which is illustrated as a short dashed reference line; that has an inflection point at 832.

FIG. 13 compares the group delay between the group delay of ideal NF and the ANF. It demonstrates the system 500 can converge to the expectation very well. The notations are listed in Table 5.

TABLE 6

Group Delay of Ideal Notch Filter vs. Adaptive Notch Filter at Steady State

| Group Delay | Ref. No. |
|---|---|
| Ideal Notch Filter | 831 |
| Adaptive Notch Filter @ 1 ms convergence | 832 |

FIG. 13 is an illustrative example of a chart 850 that shows group delay of the notch filter over an extended bandwidth of potential interest. In FIG. 13, the vertical axis shows group delay or delay in samples or sampling intervals, whereas the horizontal axis shows frequency (e.g., in MHz). Table 5 in conjunction with FIG. 13, illustrates the group delay in samples or sampling interval versus frequency of the adaptive notch filter. Group delay means the characteristic of phase change or phase distortion per unit frequency for transmission through the adaptive notch filter. If the group delay exceeds a threshold, the received radio frequency signal and the baseband signal may be distorted, such as a change in the envelope of the wave, which can impact demodulation of the pseudorandom noise code or other modulation of the radio frequency signal.

In FIG. 13, the vertical axis represents the delay in samples 888 or sampling interval, whereas the horizontal axis represents frequency 889 (e.g., in MHz). The illustrative dashed lower curve 832 with less group delay is indicated by reference curve 832. The illustrative dashed lower curve 832 is an expected curve for group delay that is a practical target value or design goal of group delay for the adaptive notch filter. In contrast, an ideal group delay response (825, 834) has no delay difference associated with a corresponding change in frequency, although such ideal group delay response is not attainable in practice. The solid upper curve 833 with greater group delay is indicated by reference curve 833 and the modeled performance will generally fall between the dashed lower curve 832 and the solid upper curve 833.

FIG. 14 is an illustrative example of graph of potential filter error in a magnitude of the desired, received signal compared between pre-convergence and post-convergence. FIG. 14 illustrate the convergence of error signal 841 (e.g., same or similar to one or more of (error) signals 203, 341, 503, and/or 603). In FIG. 14, the vertical axis represents signal magnitude 891 and the horizontal-axis represents time 892. Accordingly, in FIG. 14 the error signal has a real component (E.Re) and imaginary component (E.Im), where the imaginary component 842 falls within a region bounded by the long-dashed line and where the real component 841 coincides with curve 841, which is illustrated in short-dashed lines.

In FIG. 14, before the adaptive notch filter (ANF) converges on filter coefficients (e.g., filter vector coefficients) to attenuate the NBI components, the magnitude of the error signal is close to that of the received signal or input signal (e.g., 115, 135, or both) and the NBI components 852 can dominate the power measurement. However, after the adaptive notch filter (ANF) converges after a convergence time period (e.g., at the epoch associated with the lapse of 125 uS from initialization of the ANF), the energy of the error signal 341 can reduce to a very small value, which tends to indicate the NBI components are significantly attenuated. FIG. 14 in conjunction with Table 7 specifies the following:

TABLE 7

The Waveform of Error Signal 341 before vs. after Convergence

| Error Signal 341 | Ref. No. |
|---|---|
| E.Re (Real) | 841 |
| E.Im (Imaginary) | 842 |

FIG. 15 is illustrative example of histogram of the desired, received signal versus an error signal at a steady state. In FIG. 15, the vertical axis represents the number of occurrences (count) 854 of a received signal component of a certain magnitude, whereas the horizontal axis represents frequency 853. FIG. 15 demonstrates the energy change, in terms of the histogram, of the error signal 341, before versus after convergence. The strong NBI components tend to cause the histogram of the received signal or input signal (e.g., 115, 135 or both) to be widely spread out as shown by the histogram curve 851 prior to convergence of the active notch filter, such as illustrated by the solid lines, solid arcs or solid curves. In contrast, after the convergence of the adaptive notch filter to steady-state, the histogram curve 852 or response of the error signal (e.g., 341) after ANF becomes narrowly focused over a narrow bandwidth, as indicated by or similar to the dashed lines. FIG. 15 can be interpreted together with Table 8 as follows:

TABLE 8

The Histogram Comparison, Received Signal 115/135 vs. Error Signal 341

| Histogram | Ref. No. |
|---|---|
| Signal 115/135 | 851 |
| Signal 341 | 852 |

In the above table and through the document, "115/135" means signal 115, signal 135 or both signals 115 and 135. The adaptive notch filter and method discloses a general model to unify both infinite-impulse-response-based notch filter (NF) and a finite-impulse-response-based notch filter. In other words, the adaptive notch filter is well-suited for operation in the infinite impulse response (IIR) mode, the finite impulse response (FIR) mode, or the hybrid or dual mode filter may be referred to as a transverse filter. For example, the adaptive notch filter facilitates a physically realizable IIR based notch-filter (NF) using a Steiglitz-McBride (SM) method or a quasi-SM (QSM) method where QSM estimator modes may fluctuate over time within or more of the following modes: SM mode, LSM mode, and/or MMSE mode. Further, the SM mode pay be applied to the IIR mode, whereas the LSM mode and the MMSE mode may be well-suited for operation in the FIR mode.

The adaptive notch filter is well suited to define and evaluate the bandwidth (BW) for the first order notch filter and provides the visual illustration between the bandwidth and tunable parameters. In the adaptive notch filter, a second signal processing path (e.g., second set of delay lines with corresponding taps), against the first signal processing path (e.g., first set of delay lines with corresponding tapes), can be delayed by arbitrary number of samples to guarantee the decorrelation property to the first path (e.g., to facilitate rapid convergence or estimation by existing, commercially available electronic data processors). In one configuration, a Monte-Carlo (MC) simulation can be used to demonstrate that, without considering the correlation between multiple narrowband interference (NBI) components, the adaptive notch filter can reliably reject up to two NBI components. Further, the simplified design minimizes the computation delay and is suitable for high-speed processing (e.g., multiple bits system at tens to hundreds of MHz rate).

In this disclosure certain configurations of the adaptive notch filter supports features such as one or more of the following, to the extent applicable for the embodiment or configuration: (a) a cascaded structure which can maintains the length of parameter vector the same as basic notch filter system while improving the attenuation by approximately N×30 dB; (b) a pre-scale to the pre-emphasis filtering or adaptive line enhancer (ALE) to reduce possibly the logic size of the digital system while balancing an acceptable performance; (c) avoid the covariance matrix propagation by disregarding the correlation between multiple interferences; (d) potentially improves performance by adding additional bits on the multiplication path to compensate the precision loss by the division approximation; (e) uses a mini batch gradient-descent approach to benefit potentially from the vector processing unit which, compared with the stochastic gradient-descent method, can improve the noise resistance and improves the reliability; and (f). introduces the quantity analysis measuring the signal to noise ratio degradation related with the power and frequency separation between the narrowband interference and pseudorandom liked signal; and (g) a unit gain regulator to the ALE outputs sampled at previous epochs of a satellite navigation receiver.

In one embodiment, the pre-scaling, the pre-emphasis filtering or ALE configures a wide-bit multiplier (e.g., at least 30 bit A times 30 bit B) to address any significant timing constraint in the a specific integrated circuit (ASIC) design that would otherwise make it difficult for realize high speed data processing and real-time operation of the adaptive filter (e.g., by existing commercially available data processors at reasonable product or service offering cost).

In one embodiment, the adaptive notch filter comprises a unit gain regulator to the ALE outputs sampled at previous I epochs. To estimate the filter coefficients, the ALE samples at epoch k, which is a linear combination of the ALE outputs sampled from epoch k−1 to k−I. The ALE or data processing multiples a conjugate of the error signal sampled at epoch k by the ALE outputs sampled at k−m (m=1 . . . I) to generate the update signal to adjust the mth coefficient. Before updating the mth coefficient, a normalizer or electronic data processor normalizes the mth update signal, where the mth update signal is normalized by the amplitude of ALE output sampled at k−m and by the amplitude of the error signal sampled at epoch k. The normalizer or unit gain regulator may facilitate any of the following: elimination the I large complex multipliers, simplification of the normalization, and reduction of disturbance from the noise of the ALE outputs.

In one embodiment, the adaptive notch filter introduces a new amplitude normalization method. To normalize the data for filter coefficient estimation, the electronic data processor generally uses a division function that requires multiple clock cycles to complete. For example, if the electronic data processor is processing the data at X MHz and the division requires Y clock cycles to complete the calculation. The division logic needs to run at (X multiplied by Y) MHz to make the real-time processing possible. To further simplify the normalization calculation, the electronic data processor may use a round-up function to round the amplitude up to a certain level to converting the division into a simple shift register operation (e.g., right shift); hence, making normalization determinations potentially compatible with high-speed processing in a wide-bit system.

Although certain embodiments of receivers, systems, methods, processes and examples have been described in this disclosure, the scope of the coverage of this disclosure may extend to variants of the receiver, systems, methods, processes and examples and systems and concepts disclosed herein. For example, in any patent that may be granted on this disclosure, one or more claims can cover equivalents and variants to the full extent permitted under applicable law, among other things The following is claimed:

1. A receiver system with interference rejection, the receiver system comprising:
    an antenna for receiving a radio frequency signal;
    a downconverter for converting the radio frequency signal to an intermediate frequency signal;
    an analog-to-digital converter for converting the intermediate frequency signal or an analog baseband signal to a digital baseband signal;
    a selective filtering module for filtering of the digital baseband signal consistent with a target receive bandwidth, wherein the selective filtering module comprises a bandpass filter to filter a band that comprises a first sub-band or first frequency range of a satellite navigation receiver, a second sub-band or second frequency range of the satellite navigation receiver, or both to support separate or simultaneous adaptive notch filtering associated with the first sub-band and the second sub-band;
    a narrow band rejection filter for rejecting an interference component, wherein the selective filtering module comprises:
    an adaptive notch filter supporting an infinite impulse response mode; and
    a controller for controlling the adaptive notch filter, the controller configured to execute a Steiglitz-McBride (SM)-modeled estimator or quasi-Steiglitz-McBride (QSM)-modeled estimator to estimate filter coefficients of the adaptive notch filter, the SM-modeled estimator or QSM-modeled estimator storable in a data storage device and the controller configured to recursively adjust the filter coefficients of the adaptive notch filter based on the estimated filter coefficients.

2. The receiver system according to claim 1 wherein the adaptive notch filter has a more rapid convergence time compared to a least minimum squares estimator for estimating the filter coefficients.

3. The receiver system according to claim 1 wherein the SM-modeled estimator or QSM-modeled estimator comprises an algorithm that introduces an iterative solution, per the criteria of minimum-mean-square-error (MMSE) algorithm, rather than a least minimum squares (LMS) algorithm.

4. The receiver system according to claim 1 wherein SM-modeled estimator is associated with solving regression equations that tend to be nonlinear and intractable by applying a de-correlated two path model that is configured to convert the estimation of an auto-regression (AR) model into a combination of two moving average (MA) models, consistent with the infinite impulse response.

5. The receiver system according to claim 4 wherein the adaptive notch filter comprises:
    a first adaptive line enhancer (ALE) comprising a first signal path in the decorrelated two path model;
    a second adaptive line enhancer comprising a second signal path in the decorrelated two path model; and
    a first delay module coupled in series with the first ALE to make the adaptive notch filter physically realizable for any delay (d) greater than or equal to one (1) epoch between the first signal processing path and the second signal processing path.

6. The receiver system according to claim 5 further comprising:
    a pre-scaler for adjusting the gain of the baseband input signal to the adaptive notch filter to reduce the dynamic range of the baseband input signal and to compensate for an amplification of the first ALE.

7. The receiver system according to claim 5 further comprising:
    a narrow band interference component estimator in the second signal path; and
    a secondary notch module cascaded with an output of the narrow band interference component estimator.

8. The receiver system according to claim 1 wherein the adaptive notch filter receives the baseband signal comprising a satellite carrier signal modulated by a pseudo-random noise code (PN) sequence, receiving system noise, and narrowband interference (NBI) component;

the adaptive notch filter configured to detect and attenuate the NBI center frequency to mitigate an impact of the NBI on the demodulation of the PN sequence within the receiver, wherein the controller of the adaptive notch filter applies an autoregressive-moving-average (ARMA) or moving average (MA) model.

9. The receiver system according to claim 8 wherein the ARMA model provides two polynomials to model a process comprising: an autoregression polynomial and a moving average (MA) polynomial.

10. The receiver system according to claim 8 wherein the controller applies the MA or ARMA model to control the adaptive filter to minimize the total power, which comprises the total noise power, of an output signal of the adaptive filter to mitigate or eliminate, indirectly the NBI component.

11. The receiver system according to claim 1 wherein the controller is configured to tune the adaptive notch filter to adapt in real-time its notch frequency in alignment with a frequency of the interference component comprising narrowband interference (NBI) component in the baseband to minimize unwanted interference.

12. The receiver according to claim 1 wherein the narrowband rejection filter comprises the adaptive notch filter for filtering the interference component associated with the corresponding first sub-band and a secondary notch filter for filtering a secondary interference component associated with the corresponding second sub-band, wherein the interference component is within or adjacent to the first sub-band or the target receive band; wherein the secondary interference component in within or adjacent to the second sub-band or target receive band.

13. The receiver according to claim 1 wherein the narrowband rejection filter comprises an adaptive notch filter supporting an infinite impulse response mode to reduce noise, or alternately a finite impulse response mode, or a hybrid mode that allows the infinite impulse response mode to be at some times and the finite impulse response mode to be used at other times when SM estimator or QSM estimator does not converge or solve for the estimated filter coefficients of the adaptive notch filter within a maximum time after initialization or reset of filter coefficients.

14. The receiver according to claim 1 wherein a notch depth of the adaptive notch filter is defined by the following equation:

$$D = \frac{1 + |a_i|^2 - 2|a_1|\cos(\Delta\omega_1)}{1 - 2\rho|a_1| \cdot \cos(\Delta\omega_1) + \rho^2|a_1|^2},$$

where
$\Delta\omega_1$ is the difference of the angle frequency between the receiver estimation and the true transmission;
$|\alpha_1|$ is the norm-1 magnitude of the filter coefficient $\alpha_1$;
$|\alpha_1|^2$ is the norm-2 magnitude of the coefficient $\alpha_1$; and
$\rho$ is the bandwidth control factor or contributory notch shape factor.

15. The receiver according to claim 14 wherein the norm-1 is the vector norm for a vector that is defined by the sum of the magnitude of I complex filter coefficients, where I equals 1 for a first order filter, and wherein the norm-2 may represent the sum of the squared magnitude of I complex filter coefficients, which are equivalent to a dot product of filter coefficient vector and a conjugate transpose of the filter coefficient vector.

16. The receiver according to claim 14 wherein a notch of the 3 dB bandwidth of the above notch filter can be determined in accordance with following equation:

$$BW_{3dB} = 2\Delta\omega \, st.D(\Delta\omega) = \frac{1}{2}$$
$$= 2 \cdot \cos^{-1}\frac{1 + (2 - \rho^2)|a_1|^2}{(4 - 2\rho)|a_1|},$$

where
$BW_{3\,dB}$ denotes the 3 dB bandwidth of notch filter;
$\cos^{-1}$ is the inverse function of $\cos(\,)$;
$|\alpha_1|$ is the norm-1 magnitude of the filter coefficient $\alpha_1$;
$|\alpha_1|^2$ is the norm-2 magnitude of the coefficient $\alpha_i$; and
$\rho$ is the bandwidth control factor or contributory notch shape factor.

17. A receiver system with interference rejection, the receiver system comprising:
an antenna for receiving a radio frequency signal;
a downconverter for converting the radio frequency signal to an intermediate frequency signal;
an analog-to-digital converter for converting the intermediate frequency signal or an analog baseband signal to a digital baseband signal;
a selective filtering module for filtering of the digital baseband signal consistent with a target receive bandwidth;
a narrow band rejection filter for rejecting an interference component, wherein the selective filtering module comprises:
an adaptive notch filter supporting an infinite impulse response mode; and
a controller for controlling the adaptive notch filter, the controller configured to execute a Steiglitz-McBride (SM)-modeled estimator or a least mean squares algorithm estimator to estimate filter coefficients of the adaptive notch filter, or both the Steiglitz-McBride (SM)-modeled estimator or a least mean squares algorithm estimator, the SM-modeled estimator or least mean squares algorithm estimator being storable in a data storage device and the controller configured to recursively adjust the filter coefficients of the adaptive notch filter based on the estimated filter coefficients; wherein the Steiglitz-McBride (SM)-modeled estimator or a least mean squares algorithm estimator determines the filter coefficients in accordance with a gain regulator consistent with a four-quadrant trigonometric model.

18. The receiver system according to claim 17 wherein the gain regulator is modeled as a sign function on a complex input; the sign function that has four possible state values phase information rounded to a center of each quadrant among the four possible state values.

19. The receiver system according to claim 17 wherein the Steiglitz-McBride (SM)-modeled estimator or a least mean squares algorithm estimator determines the filter coefficients in accordance with a normalization approximation.

20. The receiver system according to claim 19 wherein the normalization approximation is determined in accordance with the following equations to round up to the closest exponent of two:

$$A_{approx} = 2^{\lceil log2A \rceil}, \text{ where}$$

A is the magnitude of complex signal,
$\lceil \; \rceil$ is the ceiling function,
$A_{approx}$ is the resultant approximation to the magnitude.

21. The receiver system according to claim 20 further comprising the following equation to refine the normalization approximation of claim 20:

$$A_{approx} = 2^{\underset{i}{argmax}\{b_i=1\}+1}, \text{ where } \underset{i}{argmax}\{b_i = 1\}$$

returns the index of the index of MSB whose $b_i=1$, for example.

22. The receiver system according to claim 17 wherein the adaptive filter comprises:
 a first set of first delay lines having corresponding first taps an output of each first delay line within the first set of delay lines;
 a second set of second delay lines having corresponding second taps at an output of each second delay line within the second set of delay lines;
 a plurality of summers, each one of the summers associated with pairs of the first tap and second tap to determine filter coefficients in accordance with a filter coefficient update process.

23. The receiver system according to claim 22 wherein the adaptive filter comprises:
 a filter coefficient updater comprising a first updater and a second updater, wherein the first updater is coupled to one of the summers and the second updater is coupled to another one of the summers.

24. The receiver system according to claim 17 wherein the adaptive filter comprises:
 a filter coefficient updater configured to execute a filter coefficient update module storable in the data storage device, the filter coefficient update module configured to determine or update filter coefficients in accordance with the following equation:

$$\alpha_{i,k}=\alpha_{i,k-1}+\{reg_{i,k}\cdot E_k>>b_{approx}\}, \text{ where}$$

$\alpha_{i,k-1}$ is the ith coefficient sampled at epoch k−1 (i=1, 2),
$reg_{i,k}$ is the ith regulator output sampled at epoch k (i=1, 2),
$E_k$ is the error signal sampled at epoch k, and
$b_{approx}$ is the shifted bits representation of approximated magnitude, equal to $\log_2 A_{approx}$.

* * * * *